US006795235B1

(12) United States Patent
Okuno et al.

(10) Patent No.: US 6,795,235 B1
(45) Date of Patent: Sep. 21, 2004

(54) OPTICAL TRANSMISSION LINE, METHOD OF MAKING OPTICAL TRANSMISSION LINE, AND OPTICAL TRANSMISSION SYSTEM

(75) Inventors: Toshiaki Okuno, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/635,900

(22) Filed: Aug. 11, 2000

(30) Foreign Application Priority Data

Dec. 24, 1999 (JP) .......................................... 11-367568

(51) Int. Cl.[7] ................................................. H01S 3/30
(52) U.S. Cl. ..................................... 359/334; 359/337
(58) Field of Search ........................ 359/341.41, 341.42, 359/342, 334, 337.5, 341.1, 343, 337; 385/65, 142

(56) References Cited

U.S. PATENT DOCUMENTS

| 5,039,199 | A | | 8/1991 | Mollenauer et al. | ........ 359/334 |
| 5,058,974 | A | | 10/1991 | Mollenauer | |
| 5,392,377 | A | | 2/1995 | Auracher | ...................... 385/24 |
| 5,778,128 | A | | 7/1998 | Wildeman | |
| 5,883,736 | A | * | 3/1999 | Oshima et al. | ............. 359/334 |
| 5,887,093 | A | | 3/1999 | Hansen et al. | ................. 385/27 |
| 6,081,366 | A | * | 6/2000 | Kidorf et al. | ................ 359/334 |
| 6,191,877 | B1 | * | 2/2001 | Chraplyvy et al. | .......... 359/124 |
| 6,366,728 | B1 | * | 4/2002 | Way et al. | .................... 359/161 |
| 2002/0001123 | A1 | * | 1/2002 | Miyakawa et al. | .......... 359/334 |

FOREIGN PATENT DOCUMENTS

| EP | 0421675 | A2 | 4/1991 |
| EP | 0518749 | A2 | 12/1992 |
| EP | 0734105 | A2 | 9/1996 |
| JP | 59126696 | A | 7/1984 |
| JP | 61014624 | A | 1/1986 |
| JP | 03010204 | A | 1/1991 |
| JP | 2617612 | | 3/1997 |
| JP | 09083441 | A | 3/1997 |
| JP | 09096843 | A | 4/1997 |
| JP | 10200509 | A | 7/1998 |
| JP | 11204866 | A | 7/1999 |
| JP | 11208998 | A | 8/1999 |

OTHER PUBLICATIONS

Miyakawa et al. OFCC 2000 vol. 4 7–10 Mar. 2000.*
Kim et al. "Ge–doped Raman fiber amplifier with enhanced signal–to–noise ratio using second Stokes contruol pulses and effect of double Rayleigh back–scattering" Lasers and Electro–Optics, 1999. pp 654–655 vol. 3 30 Aug. 3–Sep. 1999.*

(List continued on next page.)

Primary Examiner—Thomas G. Black
Assistant Examiner—Stephen Cunningham
(74) Attorney, Agent, or Firm—McDermott, Will & Emery

(57) ABSTRACT

The present invention relates to an optical transmission line enabling Raman amplification of an optical signal when pumping light is supplied thereto, a method of making this optical transmission line, and an optical transmission system using this optical transmission line. This optical transmission line is an optical transmission line enabling Raman amplification of an optical signal when pumping light is supplied thereto, wherein a region yielding the maximum value of Raman gain coefficient is separated from an end portion where the pumping light is supplied by a predetermined distance along a direction in which the pumping light advances. This optical transmission line can restrain the power of optical signal, at any point of the optical transmission line, from increasing to such an extent that optical Kerr effects occurs remarkably and from decreasing to such an extent that the SN ratio deteriorates greatly, and can fully secure the power of optical signal at the end point of the optical transmission line.

43 Claims, 15 Drawing Sheets

OTHER PUBLICATIONS

Hansen et al. "Loss compensation on dispersion compensating fiber modules by Raman amplification" OFC '98., Technical Digest. pp 20–21, Feb. 22–27, 1998.*

Okuno et al. "Silica–Based Functional Fibers with Enhanced Nonlinerarity and Their Applications" IEEE vol. 5 No. 5 pp. 1385–1391, Sep./Oct. 1999.*

International Search Report dated Dec. 19, 2000.

"Direct Optical Amplification Using Stimulated Raman Scattering in Optical Fibers", Kiyofumi Mochizuki, KDD R&D Laboratories, pp. 35–42.

"Raman Fiber Amplifier for the Spectral Region near 1.3 $\mu$m", E.M. Dianov, Laser Physics, vol. 6, No. 3, 1996. pp 579–581.

"Dense wavelength–division multiplexed transmission in "zero–dispersion" DSF by means of hybrid Raman/erbium–doped fiber amplifiers", P.B. Hansen et al., PD8–1–PD8–3.

"Soliton Propagation in Long Fibers with Periodically Compensated Loss" by Mollenauer, et al., IEEE Journal of Quantum Electronics, vol. QE–22, No. 1, Jan. 1986, pp. 157–173.

"Ultra Wide–Band Raman Amplification with a Total Gain–Bandwidth of 132nm of Two Gain–Bands Around 1.5$\mu$m" by Masuda et al., ECOC '99, Sep. 26–30, 1999, pp. II–146–147.

"25GHz–Spaced, 1 Tb/s (100×10 Gb/s) Super Dense–WDM Transmission in the C–Band Over a Dispersion–Shifted Fibre Cable Employing Distributed Raman Amplification" by Suzuki et al., ECOC '99.

"1.6Tb/s (40×40Gb/s) Transmission Over 4×100km Nonzero–Dispersion Fiber Using Hybrid Raman/Erbium–Doped Inline Amplifiers" by Nielson et al., ECOC '99.

"Experimental Investigation of Stimulated Raman Scattering Limitation on WDM Transmission Over Various Types of Fiber Infrastructures" by Bigo et al., IEEE Photonics Technology Letters, vol. 11, No. 6, Jun. 1999, pp. 671–673.

"Crosstalk Bandwidth in Backward Pumped Fiber Raman Amplifiers" by Wey et al., IEEE Photonics Technology Letters, vol. 11, No. 11, Nov. 1999, pp. 1417–1419.

"Comparision of Raman Efficiencies in Optical Fibers" by Silva et al., OFC '94 Technical Digest, pp. 136–137.

* cited by examiner

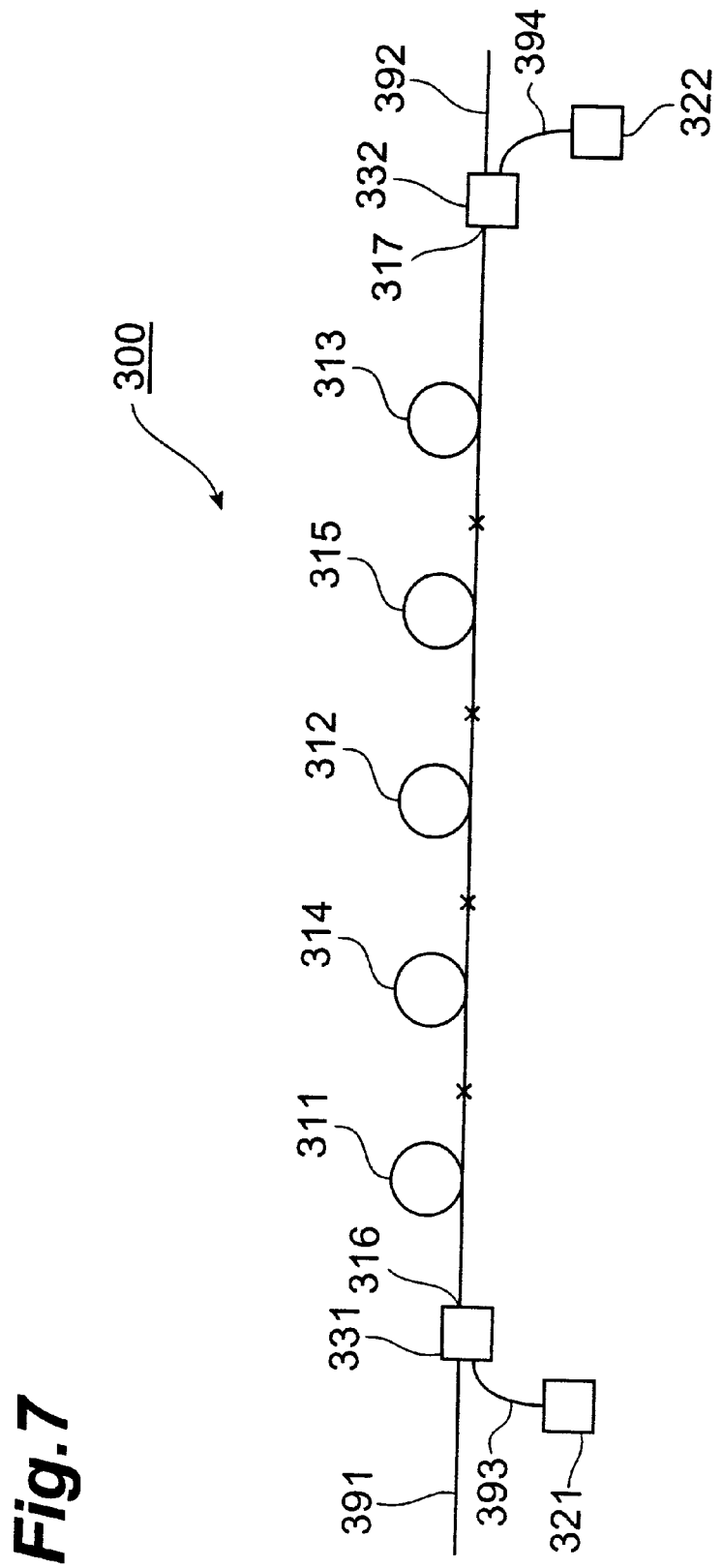

OPTICAL TRANSMISSION LINE, METHOD OF MAKING OPTICAL TRANSMISSION LINE, AND OPTICAL TRANSMISSION SYSTEM

BACKGROUND OF THE INVENTION

1. Field of the Invention

The present invention relates to an optical transmission line enabling Raman amplification of an optical signal when pumping light is supplied thereto, a method of making this optical transmission line, and an optical transmission system using this optical transmission line.

2. Related Background Art

An optical fiber amplifier amplifies optical signals so as to compensate for their loss when they propagate through an optical transmission line in an optical communication system. This optical fiber amplifier comprises a light-amplifying optical fiber and pumping light supply means. Namely, when pumping light of a predetermined wavelength is supplied from the pumping light supply means to the light-amplifying optical fiber, and an optical signal is inputted to the light-amplifying optical fiber, thus inputted optical signal is amplified by the light-amplifying optical fiber, and the amplified signal is outputted therefrom.

Known as such optical fiber amplifiers are one in which an optical fiber whose optical waveguide region is doped with a rare-earth element (e.g., Er element) is used as the light-amplifying optical fiber (hereinafter referred to as "rare-earth element doped optical fiber amplifier") and one in which Raman amplification is utilized (hereinafter referred to as "Raman amplifier"). While the rare-earth element doped optical fiber amplifier is disposed in a repeater or the like as being formed into a module, which is only used as a discrete amplifier, the Raman amplifier can not only be used as a repeater but also amplify optical signals in an optical transmission line (optical fiber) through which the optical signals propagate, which is so-called distributed amplifier. Therefore, if Raman amplification is utilized, then not only the effective loss in the optical transmission line can be reduced, but also optical Kerr effects can be restrained from occurring due to the fact that the power of optical signals at each location in the optical transmission line becomes too high.

For example, Japanese Patent Publication No. 2617612 discloses a technique using an Er element doped optical fiber together with Raman amplification, so as to attain a uniform power distribution of optical signals in the longitudinal direction of the optical fiber. On the other hand, reference 1—L. F. Mollenauer, et al., IEEE J. of Quantum Electron., Vol. QE-22, No. 1, pp. 157–173 (1986)—describes Raman amplification caused by bidirectional pumping, thus disclosing a technique for lowering the effective loss in optical transmission lines. Also, reference 2—H. Masuda, et al., EOC'99, II-146 (1999), reference 3—H. Suzuki, et al., ECO'99, PD2-4 (1999), and reference 4—T. N. Nielsen, et al., ECO'99, PD2-2 (1999) disclose techniques for Raman amplification of optical signals by use of a dispersion-shifted optical fiber or non-zero dispersion shifted fiber as an optical transmission line. While U.S. Pat. No. 5,778,128 discloses the hybrid transmission line that is composed of dispersion compensated fiber inserted between two single mode optical fibers with equal length.

SUMMARY OF THE INVENTION

The inventors have studied the conventional techniques mentioned above and, as a result, have found problems as follows. Namely, while the Raman amplification technique disclosed in Japanese Patent Publication No. 2617612 also employs an optical amplification technique using an Er element doped optical fiber, so as to attain a uniform power distribution of optical signals in the longitudinal direction of the optical fiber, the optical transmission line is not optimally designed for the case where Raman amplification is used alone. Also, this Raman amplification technique necessitates a pumping light source for supplying pumping light for pumping Er element. If the supply of pumping light is stopped due to a failure of the pumping light source and the like, then the effective loss in the optical transmission line becomes so large that optical signals cannot propagate therethrough. Also, the optimal design of optical transmission lines is insufficient for making less nonlinearity and maintaining high SN ratio in the respective Raman amplification techniques disclosed in references 1 to 4. In U.S. Pat. No. 5,778,128, there is no consideration for Raman amplification and no suggestion of transmission lines suitable for distributed Raman amplification.

In order to overcome the problems mentioned above, it is an object of the present invention to provide an optical transmission line for Raman amplification which is designed more appropriately, a method of making this optical transmission line, and an optical transmission system using this optical transmission line.

In one aspect, the optical transmission line in accordance with the present invention is an optical transmission line enabling Raman amplification of an optical signal when pumping light is supplied thereto, wherein a region yielding a maximum value of a Raman gain coefficient is separated from an end portion where the pumping light is supplied by a predetermined distance along a direction in which the pumping light advances.

In another aspect, the optical transmission line in accordance with the present invention is an optical transmission line enabling Raman amplification of an optical signal when pumping light is supplied thereto, wherein a region yielding a minimum value of transmission loss at a wavelength of the pumping light is separated from an end portion where the pumping light is supplied by a predetermined distance along a direction in which the pumping light advances.

In still another aspect, the optical transmission line in accordance with the present invention is an optical transmission line enabling Raman amplification of an optical signal when pumping light is supplied thereto, wherein a region yielding a maximum value of a Raman efficiency coefficient which is a ratio of a Raman gain coefficient to an effective area is separated from an end portion where the pumping light is supplied by a predetermined distance along a direction in which the pumping light advances.

In still another aspect, the optical transmission line in accordance with the present invention is an optical transmission line enabling Raman amplification of an optical signal when pumping light is supplied thereto, wherein a region yielding a minimum value of effective area is separated from an end portion where the pumping light is supplied by a predetermined distance along a direction in which the pumping light advances.

In such an optical transmission line, the Raman amplification effect is smaller in the region where the pumping light has a higher power including an end portion to which the pumping light is supplied, and is greater in the region, separated by a predetermined distance from the end portion, where the pumping light has a lower power. As a consequence, at any point of the optical transmission line, the power of optical signal can be restrained from increasing to such an extent that optical Kerr effects occur remarkably and from decreasing to such an extent that the SN ratio deteriorates greatly, and the power of optical signal can fully be secured at the end point of optical transmission line. Further, the effective loss in the optical transmission line can be reduced.

Preferably, in the optical transmission line in accordance with the present invention, the maximum value of Raman gain coefficient is greater by at least 20% than the Raman gain coefficient at the end portion where the pumping light is supplied, the minimum value of transmission loss is smaller by at least 20% than the transmission loss at the end portion where the pumping light is supplied, the maximum value of Raman efficiency coefficient is greater by at least 20% than the Raman efficiency coefficient at the end portion where the pumping light is supplied, or the minimum value of effective area is smaller by at least 20% than the effective area at the end portion where the pumping light is supplied. Letting $\alpha_p$ be the transmission loss with respect to the pumping light wavelength, and z be the position in the longitudinal direction of the optical transmission line, the maximum value of gradient of Raman efficiency coefficient is preferably at least $0.2 \exp(\alpha_p z)$, more preferably at least $0.4 \exp(\alpha_p z)$. Preferably, a core region contains Ge, while the region yielding the maximum value of Raman gain coefficient has a Ge content greater than that in the region including the end portion where the pumping light is supplied, the region yielding the minimum value of transmission loss has a Ge content less than that in the region including the end portion where the pumping light is supplied, the region yielding the maximum value of Raman efficiency coefficient has a Ge content greater than that in the region including the end portion where the pumping light is supplied, or the region yielding the minimum value of effective area has a Ge content greater than that in the region including the end portion where the pumping light is supplied. In any of these cases, as compared with the region including the end portion where the pumping light is supplied, the region yielding a lower power of pumping light separated by a predetermined distance from the end portion in the longitudinal direction can attain a higher Raman gain.

The optical transmission line in accordance with the present invention may comprise a plurality of optically coupled optical fibers. Here, the plurality of optical fibers preferably comprise an optical fiber having a predetermined characteristic and an optical fiber having a characteristic different from the predetermined characteristic. In this case, if a plurality of optical fibers each having a uniform characteristic in the longitudinal direction are used as being coupled together, then an optical transmission line appropriate for Raman amplification of optical signals can be constructed.

The optical transmission line in accordance with the present invention may comprise a unitary optical fiber. The method of making the optical transmission line comprises the steps of preparing an optical fiber preform having a region to become a core part and a region to become cladding parts; and making an optical fiber while changing a drawing speed, a drawing tension or a fiber outer diameter at which the optical fiber preform is drawn. Another method comprises the steps of preparing an optical fiber preform having a region to become a core part and a region to become cladding parts, in which the region to become the core part or the region to become the cladding parts has an outside diameter changing in a longitudinal direction thereof; and drawing the optical fiber preform so as to make the optical fiber. Each of these methods is suitable for making an optical fiber in which the Raman gain coefficient, transmission loss, Raman efficiency coefficient, or effective area changes in the longitudinal direction.

In addition, in above mentioned manufacturing process, if the changes in the longitudinal direction are made periodic, several transmission lines can be manufactured in one preform, which realizes mass-production and cost reduction.

The optical transmission system in accordance with the present invention comprises a transmitter for sending out an optical signal, the optical transmission line in accordance with the present invention for transmitting the optical signal sent out from the transmitter, pumping light supply means for supplying pumping light to the optical transmission line, and a receiver for receiving the optical signal propagated through the optical transmission line. According to this optical transmission system, the pumping light supply means supplies the pumping light to the optical transmission line, whereas the optical signal sent out from the transmitter is subjected to Raman amplification while propagating through the optical transmission line and then is received by the receiver. As mentioned above, this optical transmission system can restrain the optical signal, at any point of the optical transmission line, from increasing its power to such an extent that the optical Kerr effects occur remarkably and from decreasing its power to such an extent that the SN ratio greatly deteriorates, and can fully secure the power of optical signal at the end point of optical transmission line. Also, the effective loss in the optical transmission line can be reduced. As a consequence, this optical transmission system is excellent in the transmission characteristic for optical signals.

Preferably, the optical transmission line has a zero-dispersion wavelength at a given point in a wavelength band of pumping light. While a band in the vicinity of the zero-dispersion wavelength is often unused for transmitting optical signals in wavelength division multiplexing transmission in order to prevent the optical signals from deteriorating their waveform, wavelength utilization can be made more efficient if the pumping light wavelength is arranged to reside in this band. Preferably, the optical transmission line has a zero-dispersion wavelength that a given point in a wavelength band of the optical signal. In this case, the amount of accumulated dispersion at the time when the optical signal propagates through optical fibers can be kept low, whereby the waveform deterioration can be suppressed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 7 is a view for explaining a modified example of the optical transmission line and optical transmission system in accordance with the third embodiment;

DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

Figure 1A:
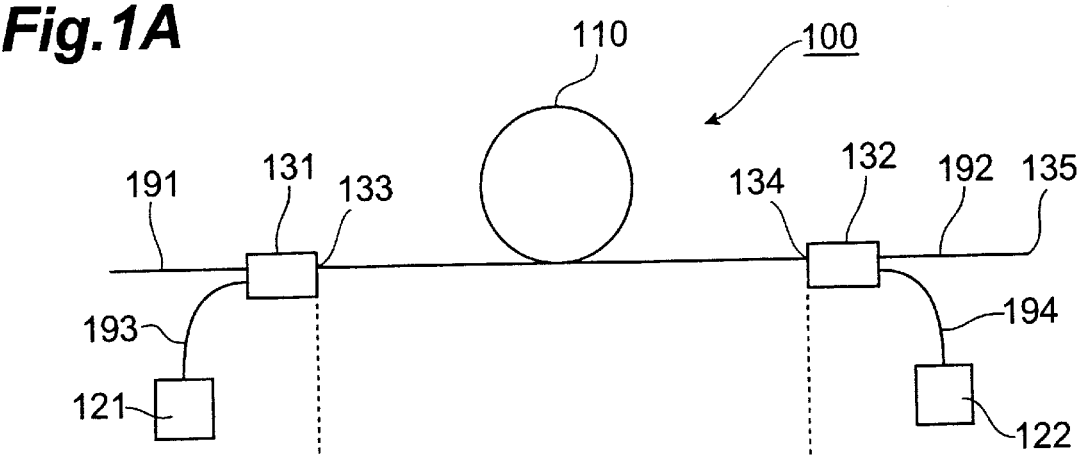
FIG. 1A is a view for explaining the optical transmission line and optical transmission system in accordance with a first embodiment.
Figure 1B:
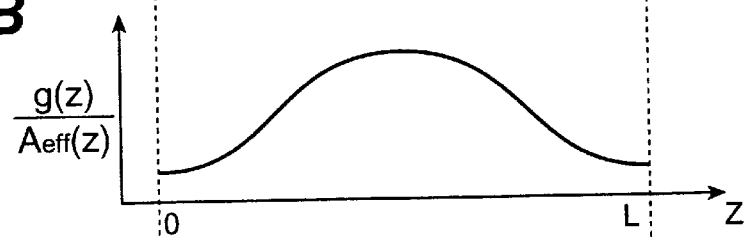
FIG. 1B is a graph showing the distribution of Raman efficiency coefficient $g(z)/A_{eff}(z)$ in an optical fiber acting as the optical transmission line in accordance with the first embodiment.
Figure 1C:
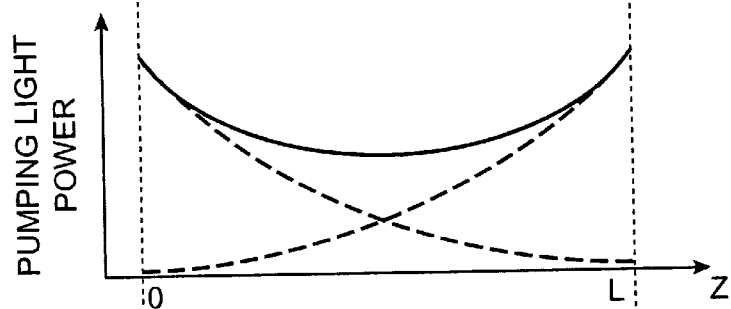
FIG. 1C is a graph showing the distribution of pumping light power in the optical fiber acting as the optical transmission line in accordance with the first embodiment.
Figure 1D:
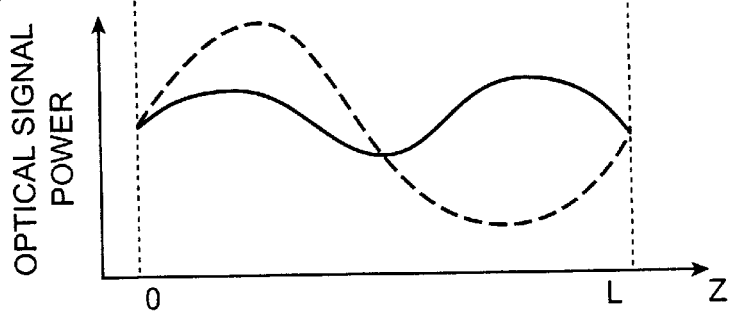
FIG. 1D is a graph showing the distribution of optical signal power in the optical fiber acting as the optical transmission line in accordance with the first embodiment.

To begin with, a first embodiment of the present invention will be explained. FIGS. 1A to 1D are explanatory views of the optical transmission system 100 and optical fiber 110 in accordance with the first embodiment of the present invention. FIG. 1A shows a schematic configuration of the optical transmission system 100; FIG. 1B shows the distribution of Raman efficiency coefficient $g(z)/A_{eff}(z)$ which is the ratio of Raman gain coefficient $g(z)$ to effective area $A_{eff}(z)$ in the optical fiber 110; FIG. 1C shows the distribution of pumping light power in the optical fiber 110; and FIG. 1D shows the distribution of optical signal power in the optical fiber 110. Here, Raman gain coefficient $g(z)$ is a function of position z in the optical fiber 110, whereas effective area $A_{eff}(z)$ is a function with respect to an pumping light wavelength at position z in the optical fiber 110.

The optical transmission system 100 comprises the optical fiber 110, which is an optical transmission line enabling Raman amplification of an optical signal when pumping light is supplied thereto; pumping light sources 121, 122 for outputting the pumping light; and multiplexers 131, 132 for introducing the pumping light to the optical fiber 110. The pumping light outputted from the pumping light source 121 is supplied forward to the optical fiber 110 by way of an optical fiber 193 and the multiplexer 131. The pumping light outputted from the pumping light source 122 is supplied backward to the optical fiber 110 by way of an optical fiber 194 and the multiplexer 132. Namely, in the optical transmission system 100, the pumping light is bidirectionally supplied to the optical fiber 110. The optical signal having reached the multiplexer 131 by propagating through an optical fiber 191 is fed into the optical fiber 110 by way of the multiplexer 131 and is subjected to Raman amplification while propagating through the optical fiber 110. Then, the optical signal subjected to Raman amplification further propagates through an optical fiber 192 by way of the multiplexer 132.

In the optical transmission system 100 employing such Raman amplification, let L be the length of the optical fiber 110, z=0 be the coordinate value of the start point of the optical fiber 110, and z=L be the coordinate value of the end point of the optical fiber 110. The power of optical signal at position z in the optical fiber 100 is expressed as $P_s(z)$. The effective area with respect to the pumping light wavelength at position z in the optical fiber 110 is expressed as $A_{eff}(z)$. The Raman gain coefficient at position z in the optical fiber 110 is expressed as $g(z)$. The transmission loss in the optical fiber 100 for the signal wavelength and the pumping light wavelength are expressed as $\alpha_s$, $\alpha_p$, respectively. The power of pumping light supplied forward at z=0 is expressed as $P_1$, whereas the power of pumping light supplied backward at z=L is expressed as $P_2$.

In this case, the optical signal power $P_s(z+dz)$ at position (z+dz) in the optical fiber 110 is expressed by:

$$P_s(z+dz) = P_s(z)\exp(-\alpha_s dz)\exp \left\{ g(z)\exp(-\alpha_p z)\frac{P_1}{A_{eff}(z)}dz + g(z)\exp[-\alpha_p(L-z)]\frac{P_2}{A_{eff}(z)}dz \right\} \quad (1)$$

when the pump depletion by which the pumping light contributes to amplification is neglected. The Raman gain $\alpha_g(z)$ at position z in the optical fiber 110 is expressed by the following expression:

$$\alpha_g(z) = g(z)\exp(-\alpha_p z)\frac{P_1}{A_{eff}(z)} + g(z)\exp[-\alpha_p(L-z)]\frac{P_2}{A_{eff}(z)} \quad (2)$$

As shown in FIG. 1B, the distribution of Raman efficiency coefficient $g(z)/A_{eff}(z)$ in the optical fiber 110 is such that the coefficient is the lowest at position z =0 or z=L, and is the highest in a region near the center. As shown in FIG. 1C, the distribution of pumping light power in the optical fiber 110 is the sum of the distribution of pumping light power supplied forward (the power being the highest at position z=0, so as to become higher as the value of z is smaller) and the distribution of pumping light power supplied backward (the power being the highest at position z=L, so as to become higher as the value of z is greater). As a consequence, the distribution of pumping light power in the optical fiber 110 is such that the power is the highest at position z=0 or z=L and is lower in the region near the center.

The distribution of optical signal power $P_s(z)$ in the optical fiber 110 is the sum of the increase caused by Raman amplification and the transmission loss in the case where no Raman amplification is supposed to exist. Namely, the distribution of optical signal power $P_s(z)$ is such that, as shown in FIG. 1D, the optical signal power tends to successively increase, decrease, increase, and decrease as z increases from z=0 to z=L. Thus, the effective loss in the optical fiber 110 can be made smaller. Also, at any point of the optical fiber 110, the optical signal power can be restrained from increasing to such an extent that optical Kerr effects occur remarkably and from decreasing to such an extent that the SN ratio deteriorates greatly. Further, the optical signal power $P_s(L)$ at the end point of the optical fiber 110 can fully be secured.

The broken curve in FIG. 1D indicates the distribution of optical signal power $P_s(z)$ when Raman efficiency coefficient $g(z)/A_{eff}(z)$ is assumed to be constant regardless of position z. In this case, the optical signal power becomes so high at a certain point in the optical fiber 110 that optical Kerr effects are likely to occur remarkably. Also, the optical signal power becomes so low at another point in the optical fiber 110 that the SN ratio may deteriorate.

Thus, the optical fiber 110 in accordance with this embodiment is designed such that, as compared with regions with a higher pumping light power (near z=0 and near z =L) including the end portions 133, 134 where the pumping light is supplied, the region (near the center), yielding a lower pumping light power, separated by a predetermined distance from the end portions 133, 134 in the longitudinal direction attains a greater Raman gain $\alpha_g$.

Namely, as can be seen from the-above-mentioned expressions (1) and (2), the optical fiber 110 in accordance with this embodiment is designed such that the region attaining the maximum value of Raman efficiency coefficient $g(z)/A_{eff}(z)$ resides in a region, yielding a lower pumping light power, separated by a predetermined distance in the advancing direction of pumping light from the end portions 133, 134 (z=0, z=L) where the pumping light is supplied as shown in FIG. 1B. More specifically, it is designed such that, while keeping the effective area $A_{eff}(z)$ substantially constant, the region attaining the maximum value of Raman gain coefficient $g(z)$ resides in a region, yielding a lower pumping light power, separated by a predetermined distance in the advancing direction of pumping light from the end portions 133, 134 (z=0, z=L) where the pumping light is supplied. Alternatively, it is designed such that, while keeping the Raman gain coefficient $g(z)$ substantially constant, the region attaining the minimum value of effective area $A_{eff}(z)$ resides in a region, yielding a lower pumping light power, separated by a predetermined distance in the advancing direction of pumping light from the end portions 133, 134 (z=0, z=L) where the pumping light is supplied. Also, for realizing such an optical fiber 110, it may be designed, as can be seen from the above-mentioned expressions (1) and (2), such that the region yielding the minimum value of transmission loss $\alpha_p$ at the pumping light wavelength resides in a region, yielding a lower pumping light power, separated by a predetermined distance in the advancing direction of pumping light from the end portions 133, 134 (z=0, z=L) where the pumping light is supplied.

In the optical fiber 110, it is preferred that the maximum value of Raman efficiency coefficient $g(z)/A_{eff}(z)$ be greater by at least 20% than the Raman efficiency coefficient at the end portions 133, 134 where the pumping light is supplied. Alternatively, it is preferred that the maximum value of Raman gain coefficient $g(z)$ be greater by at least 20% than the Raman gain coefficient at the end portions 133, 134 where the pumping light is supplied. Alternatively, it is preferred that the minimum value of effective area $A_{eff}(z)$ be smaller by at least 20% than the effective area at the end portions 133, 134 where the pumping light is supplied. Alternatively, it is preferred that the minimum value of transmission loss $\alpha_p$ be smaller by at least 20% than the transmission loss at the end portions 133, 134 where the pumping light is supplied. In a conventional optical transmission line, a greater gain is generated upstream of a point separated by a predetermined distance (about 5 km) from an end portion where pumping light is incident, i.e., before the pumping light power lowers by 1 dB (about 20%) or so. Therefore, on the downstream of the point where the pumping light lowers by 1 dB or so, the amplification effect caused by Raman amplification becomes at least about twice as much if the Raman efficiency coefficient or Raman gain coefficient is made greater by at least 20% than that at the end portions 133, 134 where the pumping light is supplied, whereby the amplification effect of optical signal power appears greatly. Alternatively, on the downstream of the point where the pumping light lowers by 1 dB or so, the amplification effect caused by Raman amplification becomes at least about twice as much if the effective area or transmission loss is made smaller by at least 20% than that at the end portions 133, 134 where the pumping light is supplied, whereby the amplification effect of optical signal power appears greatly.

Letting $\alpha_p$ be the transmission loss with respect to the pumping light wavelength, and z be the position in the optical transmission line in the longitudinal direction, the maximum value of gradient of Raman efficiency coefficient $g(z)/A_{eff}(z)$ is preferably at least $0.2 \exp(\alpha_p z)$, more preferably at least $0.4 \exp(\alpha_p z)$. As a consequence, while the pumping light power decays, the Raman efficiency coefficient increases by at least 20%, more preferably by at least 40%, whereby the decrease in gain can be, suppressed by at least 20%, more preferably by at least 40%, as compared with the case where the Raman efficiency coefficient is constant.

Preferably, the optical fiber 110 comprises an optical fiber containing Ge in a core region thereof, while the region yielding the maximum value of Raman efficiency coefficient $g(z)/A_{eff}(z)$ has a Ge content greater than that in regions including the end portions 133, 134 where the pumping light is supplied. Alternatively, it is preferred that the region yielding the maximum value of Raman gain coefficient $g(z)$ have a Ge content greater than that in the regions including the end portions 133, 134 where the pumping light is supplied. Alternatively, it is preferred that the region yielding the minimum value of effective area $A_{eff}(z)$ have a Ge content greater than that in the regions including the end portions 133, 134 where the pumping light is supplied. Alternatively, it is preferred that the region yielding the minimum value of transmission loss $\alpha_p$ have a Ge content less than that in the regions including the end portions 133, 134 where the pumping light is supplied. In such a manner, as compared with the regions in which the power of pumping light is higher, including the end portions where the end portions 133, 134 are supplied, the Raman gain $\alpha_p(z)$ can be made greater in the region where the power of pumping light is lower, separated by a predetermined distance from the end portions 133, 134 in the longitudinal direction.

Preferably, the optical waveguide region of the optical fiber 110 is doped with an impurity (e.g., not only Ge but also Al, p, or a rare-earth element) which can amplify the optical signal. In this manner, the amplification efficiency for optical signals can be enhanced. In particular, the impurity preferably includes Er element. In this case, the amplification caused by Er element and the Raman amplification are used together, whereby the amplification efficiency for optical signals can further be enhanced.

Preferably, the optical fiber is a polarization-preserving optical fiber which propagates light while keeping the state of polarization of light. In this case, the respective polarization states of optical signal and pumping light can be made to coincide with each other, which is preferable for enhancing the amplification efficiency. Preferably, the optical fiber 110 has a polarization mode dispersion of 0.25 $ps/km^{1/2}$ or less at the signal wavelength. This configuration is preferable for carrying out high-speed optical communications with a bit rate of 10 Gb/s or higher, since the propagation time difference at a length of 10,000 km is suppressed to 25 ps or less.

Preferably, in the optical fiber 110 in accordance with this embodiment, the dispersion value at the signal wavelength in the regions including the end portions 133, 134 where the pumping light is supplied and the dispersion value at the signal wavelength in the region yielding the minimum value of effective area have opposite sign to, each other. As a consequence, the accumulated dispersion per span of the amplification region constituted by the optical fiber 110 can be made smaller.

More preferably, the dispersion value at the signal wavelength in the regions including the end portions 133, 134 where the pumping light is supplied is positive, whereas the dispersion value at the signal wavelength in the region yielding the minimum value of effective area is negative. Optical fibers having a large effective area and a positive dispersion are easy to make, whereby the cost can be cut down. On the other hand, optical fibers having a negative dispersion generally have a smaller effective area and a greater Raman gain. Therefore, a favorable optical transmission line can be constituted if a plurality of such optical fibers are coupled together by fusion or the like.

Preferably, in the optical fiber 110 in accordance with this embodiment, the absolute value of dispersion at the signal wavelength in the region yielding the minimum value of effective area is greater than the absolute value of dispersion at the signal wavelength in the regions including the end portions 133, 134 where the pumping light is supplied. As a consequence, because optical Kerr nonlinearity is also usually large at the region of high Raman gain, signal degradation can be supressed by means of making dispersion large, whereby accumulated dispersion can be made smaller.

In the optical fiber 110 in accordance with this embodiment, the minimum value of effective area is preferably not greater than 0.8 times, more preferably not greater than 0.45 times the effective area at the end portions 133, 134 where the pumping light is supplied. As a consequence, the SN ratio of optical signal outputted from the end portions 133, 134 can be improved, and the improving effect is remarkable in the latter case in particular, whereby the optical signal can further be transmitted over a longer distance.

Preferably, the dispersion value at the signal wavelength in the region yielding the minimum value of effective area is −8 ps/nm/km or less in the optical fiber 110 in accordance with this embodiment. Optical fibers having a smaller effective area and a negative dispersion are easy to make. When the dispersion is provided with a certain extent of magnitude, the positive accumulated dispersion generated near both end portions 133, 134 of the optical fiber 110 can effectively be compensated for, and four-wave mixing can be suppressed.

Preferably, the absolute value of average dispersion at the signal wavelength is 5 ps/nm/km or less in the optical fiber 110 in accordance with this embodiment. As a consequence, in the case where transmission over a distance of 100 km is carried out with a transmission speed of 10 Gb/s, for example, favorable transmission can be carried out while the accumulated dispersion is suppressed to a permissible level of 500 ps/nm or less even when wavelength range expansion, SN deterioration, and nonlinear deterioration are taken into account.

Preferably, the absolute value of average dispersion slope at the signal wavelength in the optical fiber 110 in accordance with this embodiment is 0.03 ps/nm²/km or less. In the case where the absolute value of average dispersion slope is 0.03 ps/nm²/km, the difference in dispersion value becomes 0.9 ps/nm/km between the respective channels of both ends in the signal band of 30 nm, for example. As the difference in dispersion value is greater, the difference in accumulated dispersion becomes greater even in the transmission on the order of 100 km, whereby the channel dependence of transmission characteristics is assumed to enhance. Therefore, in order for the system to operate stably and secure favorable transmission characteristics, 0.03 ps/nm²/km is appropriate for the upper limit of absolute value of average dispersion slope.

Preferably, the optical fiber 110 in accordance with this embodiment has a length of at least 40 km. The optical fiber 110 in accordance with this embodiment is particularly effective for transmitting the optical signal over a distance of 40 km or longer, and the optical transmission system 100 can cut down its cost in this manner.

Preferably, the power of optical signal incident on the optical fiber 110 acting as the optical transmission line is 0 dBm or less per channel in the optical transmission system 100 in accordance with this embodiment. In the case of transmission over a long distance of 150 km or longer without a repeater, the power of pumping light becomes so high that it is maximized at a point slightly downstream of the end portion 133 where the optical signal is incident in copropagating pumping, whereby local nonlinear deterioration may occur to such an extent that it cannot be neglected. If the power of optical signal is set to 0 dBm or less per channel, then the nonlinear deterioration can be suppressed, so that the optical transmission system 100 can operate stably. If the power of optical signal is set to −15 dBm or less per channel in particular, then long-distance transmission over several hundreds of kilometers or more can stably be carried out with repeater amplifiers inserted therein. Further, if the power of optical signal is set to −10 dBm or less per channel, then long-distance transmission over several thousands of kilometers and high-density WDM (Wavelength Division Multiplexing) transmission at intervals of several tens of gigahertz can stably be carried out with repeater amplifiers inserted therein.

Preferably, in the optical fiber 110 acting as the optical transmission line in the optical transmission system 100 in accordance with this embodiment, the minimum of absolute values of dispersion at any position of the fiber 110, that called "local dispersion", in the signal wavelength band is at least 2 ps/nm/km, whereas the accumulated nonlinear phase shift is 1.71 or less.

Preferably, in the optical fiber 110 acting as the optical transmission line in the optical transmission system 100 in accordance with this embodiment, the minimum of absolute values of local dispersion in the signal wavelength band is at least 2 ps/nm/km, whereas the local nonlinear phase shift is $5.4 \times 10^{-5}$/m or less.

Preferably, in the optical fiber 110 acting as the optical transmission line in the optical transmission system 100 in accordance with this embodiment, the minimum of absolute values of local dispersion in the signal wavelength band is 2 ps/nm/km or less, whereas the accumulated nonlinear phase shift is 0.171 or less.

Preferably, in the optical fiber 110 acting as the optical transmission line in the optical transmission system 100 in accordance with this embodiment, the minimum of absolute values of local dispersion in the signal wavelength band is 2 ps/nm/km or less, whereas the local nonlinear phase shift is $5.4 \times 10^{-6}$/m or less.

In the case of WDM transmission, influences of cross phase modulation (XPM) and four-wave mixing (FWM) may appear. In the case where the absolute value of local dispersion in the signal wavelength band is at least 2 ps/nm/km in the optical fiber 110, the influence of FWM is considered to be relatively small, whereby characteristics of the optical transmission system can be estimated from the influence of XPM.

Hence, the nonlinear phase shift $\Delta\eta$ is initially defined by the following expression (3):

$$\Delta\eta = \frac{2\pi}{\lambda} \cdot \frac{n_2}{A_{eff}} \int_0^L P(z) dz \qquad (3)$$

Here, $\lambda$ is the wavelength of optical signal, and $n_2$ is the nonlinear refractive-index of the optical fiber 110 acting as the optical transmission line. Also, $A_{eff}$ is the effective area of the optical fiber 110 acting as the optical transmission line, and P(z) is the power of optical signal at position z.

In the case of a dispersion-shifted optical fiber (having a transmission loss α of 0.2 dB/km, a nonlinear refractive index $n_2$ of $3.3 \times 10^{-20}$ μm²/W, and an effective area $A_{eff}$ of 50 μm), if the input peak power at a signal wavelength of 1550 nm is 10 dBm per channel with respect to L=80 km, i.e., effective length $L_{eff}$=21.2 km, then the nonlinear phase shift $\Delta\eta$ becomes:

$$\Delta\eta = \frac{2\pi}{\lambda} \cdot \frac{n_2}{A_{eff}} \cdot P \cdot L_{eff} = 0.57 \qquad (4)$$

On the other hand, the accumulated nonlinear phase shift $\Delta\phi$ is defined by the following expression (5):

$$\Delta\phi = \frac{2\pi}{\lambda} \cdot \frac{n_2}{A_{eff}} (P \cdot L_{eff} + P' \cdot L'_{eff} + P'' \cdot L''_{eff}) \qquad (5)$$

as the influence of adjacent two wavelengths for both sides of the optical signal.

Here, P' and P" are the power of optical signal in the adjacent channels, and $L'_{eff}$ and $L''_{eff}$ are the effective lengths of the adjacent channels. However, the effective area $A_{eff}$ is made constant. If there is no dependence of transmission loss and optical signal power among the channels, then the accumulated nonlinear phase shift $\Delta\phi$ is expressed by:

$$\Delta\phi = \frac{2\pi}{\lambda} \cdot \frac{n_2}{A_{eff}} \cdot 3P \cdot L_{eff} \qquad (6)$$

In the case of high-speed transmission at 2.5 Gb/s or faster with wavelength intervals of 100 GHz or shorter, it has experimentally been verified that the average input peak power is required to be 10 dBm or less per channel. As a consequence, from the above-mentioned expressions (4) and (6), it is necessary for the accumulated nonlinear phase shift $\Delta\phi$ to be 1.71 or less.

Also, the local nonlinear phase shift $\Delta\psi$ is defined by the following expression (7):

$$\Delta\psi = \max[\Delta\psi(z)] = \frac{2\pi}{\lambda} \cdot \frac{n_2}{A_{eff}} \cdot P(z) \qquad (7)$$

Figure 2:
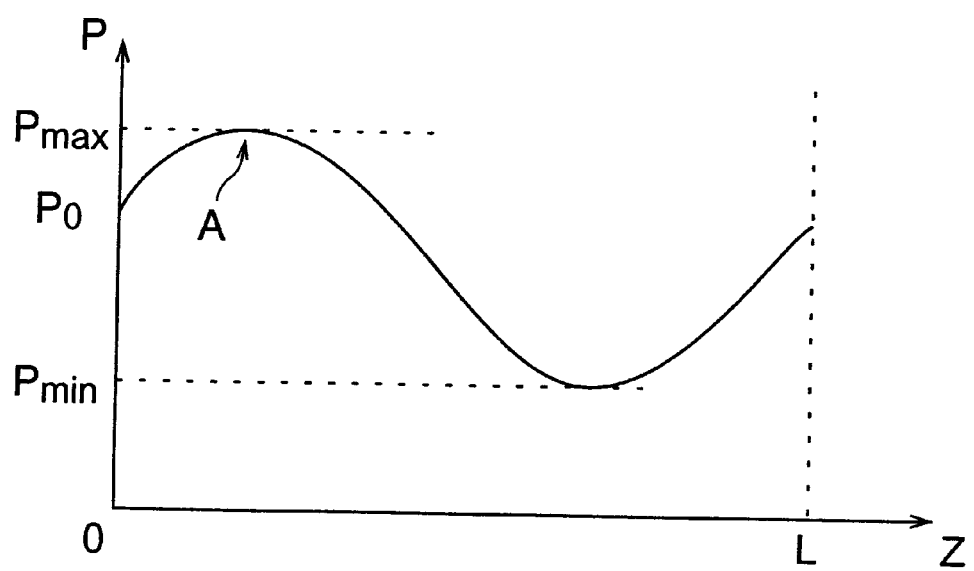
FIG. 2 is a graph schematically showing how the optical signal power fluctuates in an optical fiber acting as an amplification region.

The fluctuation of optical signal power in the optical fiber 110 acting as the amplification region is as shown in FIG. 2.

Here, even when the incident power of optical signal is small enough to satisfy expression (6), nonlinear deterioration may occur in the region indicated by A in FIG. 2 if the power increases in the optical transmission line. Hence, the local nonlinear phase shift $\Delta\psi$ is effectively defined, so as to restrict the transmission condition.

While it is considered substantially sufficient if influences of nonlinear phenomena are taken into consideration with the level of a meter, it has been verified that deterioration becomes greater when $P_{max} \geq 2P_0$ on the basis of the above-mentioned conditions. Therefore, favorable transmission can be secured if the local nonlinear phase shift $\Delta\psi$ is set to $5.4\times10^{-5}$/m or less.

In the case where the absolute value of local dispersion in the signal wavelength band was 2 ps/nm/km or less in the optical fiber 110, on the other hand, the allowable maximum input peak power was 0 dBm per channel when the parameters other than dispersion were set identical to the above-mentioned conditions (though the wavelength intervals were made as narrow as possible with respect to the bit rate).

Therefore, in the case where the absolute value of local dispersion in the signal wavelength band is 2 ps/nm/km or less in the optical fiber 110, favorable transmission can be secured if the accumulated phase shift $\Delta\psi$ is 0.171 or less or if the local phase shift $\Delta\psi$ is $5.4\times10^{-6}$/m or less.

Preferably, the SN ratio at an exit end 135 of the optical signal propagating through the optical transmission line is at least 18 dB in the optical transmission system 100 in accordance with this embodiment. Since receiving characteristics deteriorate in conventional optical receivers when the SN ratio becomes 18 dB or less for more than 1 Gb/s transmission, favorable transmission characteristics can be secured if the SN ratio is 18 dB or higher.

Preferably, the optical transmission system 100 in accordance with this embodiment yields an SN ratio of at least 12 dB at the exit end 135 of the optical signal propagating through the optical transmission line, and has a forward error correction function. If the forward error correction function is provided, then the lower limit of SN ratio can further be lowered, whereby favorable transmission characteristic can be secured even when the SN ratio is 12 dB or higher.

The optical fiber 110 may comprise a plurality of optically coupled optical fibers, or a single unitary optical fiber. In the case where the optical fiber 110 is unitary, it is manufactured, for example, as follows.

Figure 3:
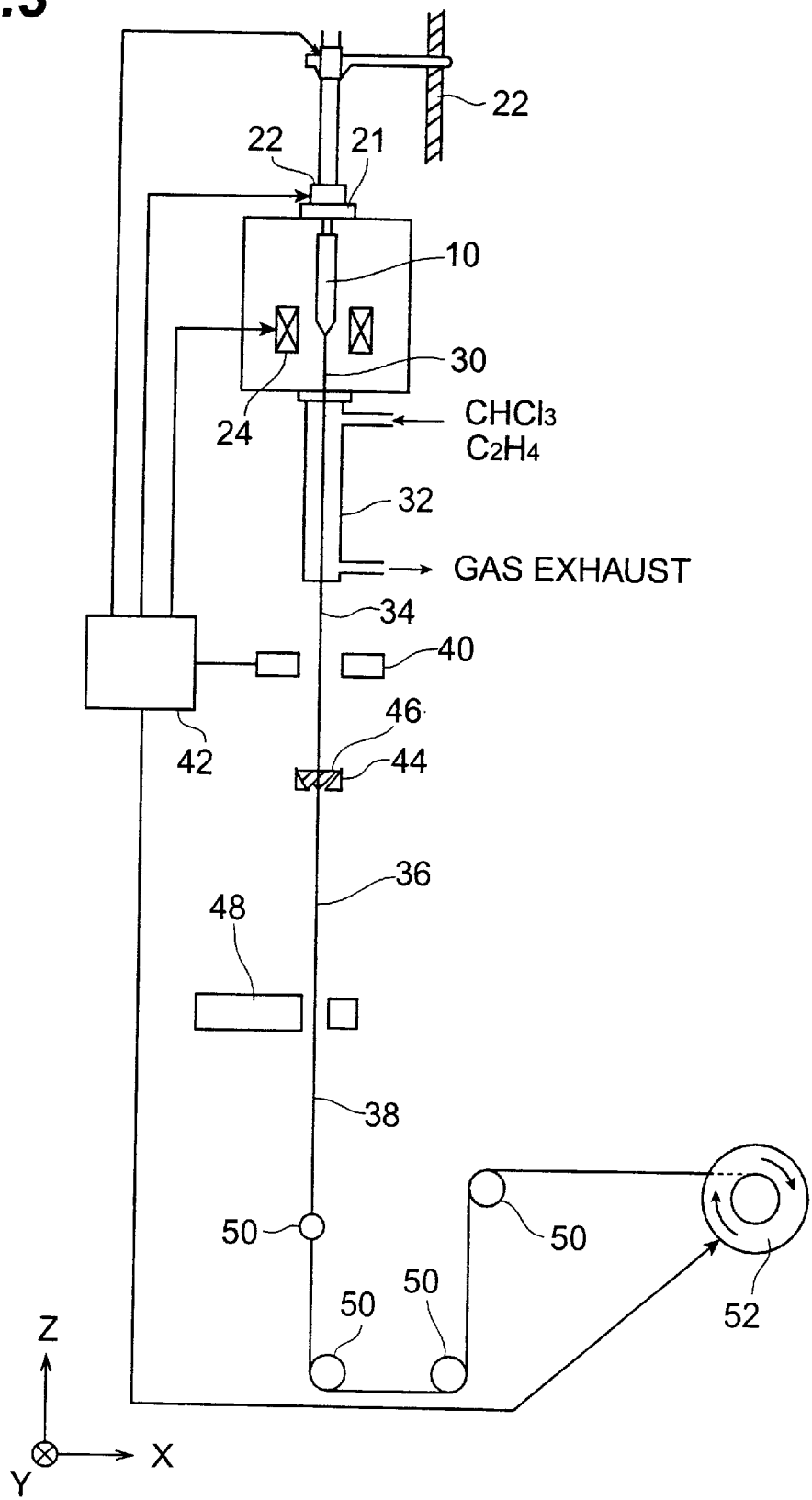
FIG. 3 is a view showing the typical structure of an apparatus for making an optical fiber as an optical transmission line.

As shown in FIG. 3, an optical fiber preform 10 to be drawn is initially prepared in the making of a unitary optical fiber. The optical fiber preform 10 has a region 12 to become a core part and a region 14 to become cladding parts, whereas the outside diameter of the region 12 to become the core part and the outside diameter of the region 14 to become the cladding parts are substantially constant in the longitudinal direction. The optical fiber preform 10 is mainly-composed of silica glass, and can be prepared by vapor-phase axial deposition method (VAD method), outside vapor deposition method (OVD method), inside vapor phase oxidation method (MCVD method), rod-in-tube method, or the like.

Next, the optical fiber preform 10 is attached to a dummy rod 20, and a preform leader 22 moves the dummy rod 20 toward a heater 24, whereby the optical fiber preform 10 attached to the dummy rod 20 is introduced into the heater 24. As the lower end of the optical fiber preform 10 heated by the heater 24 is drawn, a bare fiber 30 is obtained.

Subsequently, the bare fiber 30 obtained by drawing passes through a reaction tube 32 for forming a carbon coat. A mixed gas of carbon halide ($CHCl_3$, $CCl_4$, or the like) and hydrocarbon ($C_2H_4$, $C_3H_8$, $C_6H_6$, or the like) is supplied into the reaction tube 32. As the carbon halide and hydrocarbon in the mixed gas react with each other on the surface of bare fiber 30, the surface of bare fiber 30 is covered with a hermetic coat (carbon coat) mainly composed of carbon. Almost all fibers don't need to be carbon-coated and just only cooling equipments are usually arranged at the place of the reaction tube 32 in FIG. 3.

The outside diameter of the optical fiber 34 is measured by a laser outside diameter meter 40. A control system 42 controls the heating temperature and drawing speed according to the result of measurement obtained by the laser outside diameter meter 40, such that the outside diameter of the optical fiber 34 becomes a predetermined value (usually 125 $\mu$m).

The optical fiber 34 having passed through the laser outside diameter meter 40 further passes through a liquid resin 46 stored in a resin coating die 44, whereby the resin 46 adheres to the surface of the optical fiber 34. As a consequence, a resin-attached fiber 36 is produced. Subsequently, the resin-attached fiber 36 passes a UV lamp 48. At this time, the resin attached to the surface of the optical fiber 34 cures due to UV irradiation from the UV lamp 48. As a consequence, an optical fiber 38 in which the surface of the optical fiber 34 is covered with a resin film is obtained, and thus obtained optical fiber 38 is taken up by a drum 52 by way of guide rollers 50.

In the foregoing drawing step, the drawing speed or the drawing tension for drawing the optical fiber preform 10 or the fiber outer diameter is changed every time when the length of bare fiber 30 attains a predetermined value, whereby the unitary optical fiber 110 in which Raman gain coefficient $g(z)$, effective area $A_{eff}(z)$, Raman efficiency coefficient $g(z)/A_{eff}(z)$, or transmission loss $\alpha_p$ changes in the longitudinal direction can be manufactured.

In addition, in above mentioned manufacturing process, if the changes in the longitudinal direction are made periodic, several transmission lines can be manufactured in one preform, which realizes mass-production and cost reduction.

Figure 4A:
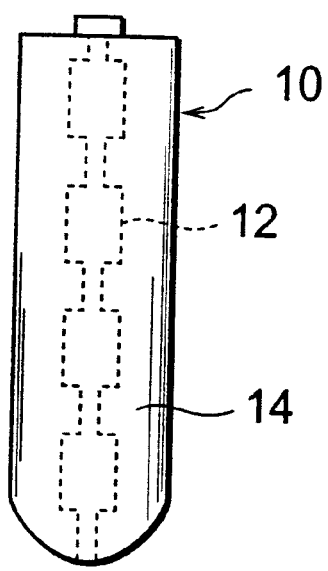
FIGS. 4A and 4B are views showing structural examples of optical fiber preform for yielding a unitary optical fiber as the optical transmission line.
Figure 4B:
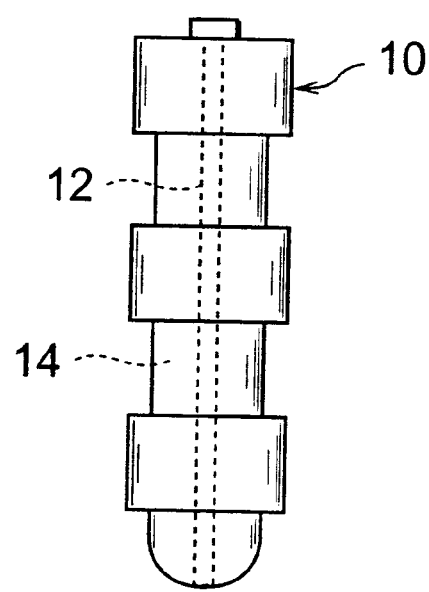

Here, the unitary optical fiber 110 in which Raman gain coefficient $g(z)$, effective area $A_{eff}(z)$, Raman efficiency coefficient $g(z)/A_{eff}(z)$, or transmission loss $\alpha_p$ changes in the longitudinal direction can be manufactured when the drawing speed or the drawing tension at the time of drawing the optical fiber preform 10 or the fiber outer diameter is changed as mentioned above. However, even when the drawing speed or the drawing tension at the time of drawing or the fiber outer diameter is set constant, the unitary optical fiber 110 in which Raman gain coefficient $g(z)$, effective area $A_{eff}(z)$, Raman efficiency coefficient $g(z)/A_{eff}(z)$, or transmission loss $\alpha_p$ changes in the longitudinal direction can be manufactured if the optical fiber preform 10 to be prepared beforehand is processed as shown in FIGS. 4A and 4B, for example, and then is drawn. For example, the optical fiber preform 10 shown in FIG. 4A has a structure in which, while the outside diameter of the region 14 to become the cladding parts is held constant, the outside diameter of the region 12 to become the core part is changed along the longitudinal direction thereof.

The optical fiber preform 10 shown in FIG. 4B, on the other hand, has a structure in which, while the outside diameter of the region 12 to become the core part is held constant, the outside diameter of the region 14 to become the cladding parts is changed along the longitudinal direction thereof.

In this case, also, if the changes in the longitudinal direction are made periodic, several transmission lines can be manufactured in one preform, which realizes mass-production and cost reduction.

The wavelength band of optical signal is 1.3 μm or 1.55 μm, for example. If the signal wavelength band is a 1.3-μm band, then the pumping light wavelength band is from 1.15 μm to 1.3 μm. If the signal wavelength band is a 1.55-μm band, then the pumping light wavelength band is from 1.4 μm to 1.5 μm.

Preferably, the optical fiber 110 has a zero-dispersion wavelength that a given point in the wavelength band of pumping light. In this case, the efficiency in use of the wavelength band of optical signal can be enhanced. Preferably, the optical fiber 110 has a zero-dispersion wavelength at a given point in the wavelength band of Optical signal. In this case, the amount of accumulated dispersion can be kept low when the optical signal propagates through the optical fiber 110, whereby the waveform deterioration can be suppressed. Preferably, the group velocity of optical signals at a given point of the optical fiber 110 is substantially identical to the group velocity of pumping light supplied forward. In this case, the optical signal can be subjected to Raman amplification most effectively. Preferably, the pumping light supplied to the optical fiber 110 includes at least two polarized waves orthogonal to each other. In this case, Raman amplification independent of the state of polarization of optical signal is achieved.

Figure 5A:
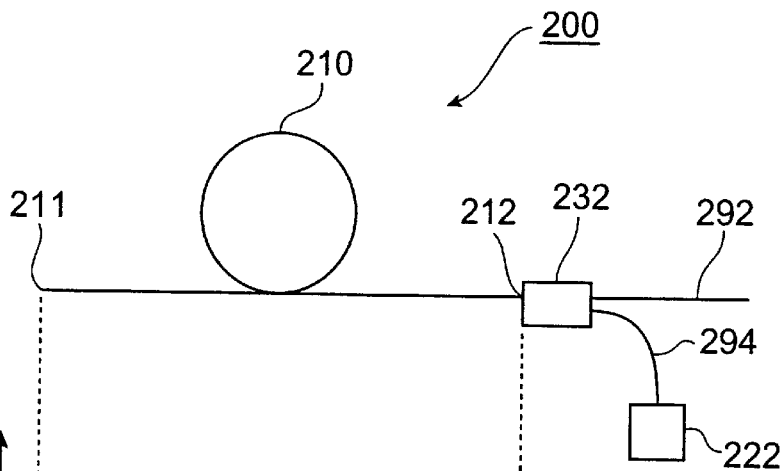
FIG. 5A is a view for explaining the optical transmission line and optical transmission system in accordance with a second embodiment.
Figure 5B:
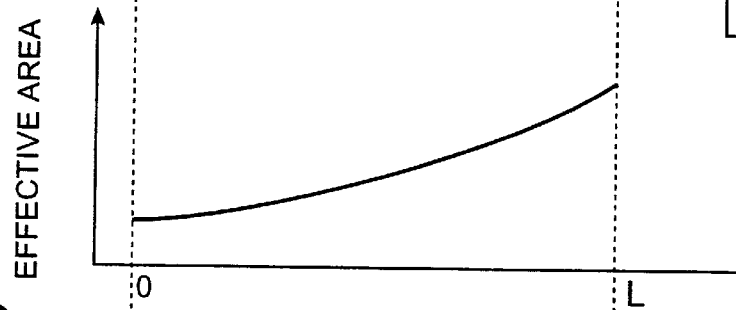
FIG. 5B is a graph showing the distribution of effective area $A_{eff}(z)$ in an optical fiber acting as the optical transmission line in accordance with the second embodiment.
Figure 5C:
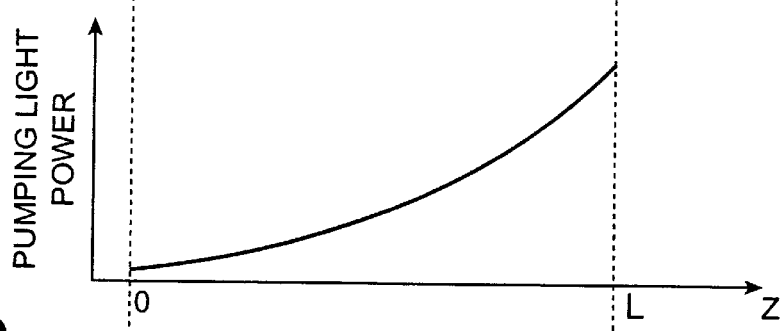
FIG. 5C is a graph showing the distribution of pumping light power in the optical fiber acting as the optical transmission line in accordance with the second embodiment.
Figure 5D:
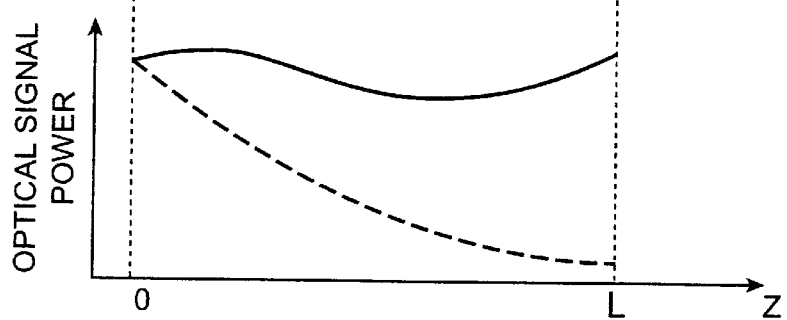
FIG. 5D is a graph showing the distribution of optical signal power in the optical fiber acting as the optical transmission line in accordance with the second embodiment.

A second embodiment of the present invention will now be explained. FIGS. 5A to 5D are explanatory views of the optical transmission system 200 and optical fiber 210 in accordance with the second embodiment. FIG. 5A shows the schematic configuration of the optical transmission system 200; FIG. 5B shows the distribution of effective area $A_{\mathit{eff}}(z)$ in the optical fiber 110; FIG. 5C shows the distribution of pumping light power in the optical fiber 210; and FIG. 5D shows the distribution of optical signal power in the optical fiber 210.

The optical transmission system 200 comprises the optical fiber 210, which is an optical transmission line enabling Raman amplification of an optical signal when pumping light is supplied thereto; an pumping light source 222 for outputting the pumping light; and a multiplexer 232 for introducing the pumping light to the optical fiber 210. The pumping light outputted from the pumping light source 222 is supplied backward to the optical fiber 210 by way of an optical fiber 294 and the multiplexer 232. The optical signal inputted to the optical fiber 210 is subjected to Raman amplification while propagating through the optical fiber 210. Then, the optical signal subjected to Raman amplification further propagates through an optical fiber 292 by way of the multiplexer 232.

As shown in FIG. 5B, the effective area $A_{\mathit{eff}}(z)$ in the optical fiber 210 is the largest at an end portion 212 (position z=L) where the pumping light is supplied, so as to become larger as the value of z is greater. Namely, as compared with a region (in the vicinity of z=L) with a higher pumping light power including the end portion 212 where the pumping light is supplied, a region (in the vicinity of z=0), yielding a lower pumping light power, separated by a predetermined distance from the end portion 212 in the longitudinal direction attains a smaller effective area $A_{\mathit{eff}}(z)$ in the optical fiber 210. Since Raman gain coefficient g(z) is substantially constant with respect to z, Raman efficiency coefficient $g(z)/A_{\mathit{eff}}(z)$ is the highest at the end portion 212 (position z=L) where the pumping light is supplied, so as to become higher as the value of z is greater.

As shown in FIG. 5C, the distribution of pumping light power in the optical fiber 210 is such that the power is the highest at position z=L, so as to become higher as the value of z is greater.

The distribution of optical signal power $P_s(z)$ in the optical fiber 210 is the sum of the increase caused by Raman amplification and the transmission loss in the case where no Raman amplification is supposed to exist. Namely, the distribution of optical signal power $P_s(z)$ is such that, as shown in FIG. 5D, the optical signal power tends to successively increase, decrease, and increase as z increases from z=0 to z=L.

Thus, the optical transmission system 200 can lower the effective loss in the optical fiber 210. Also, at any point of the optical fiber 210, it can restrain the optical signal power from increasing to such an extent that optical Kerr effects occur remarkably and from decreasing to such an extent that the SN ratio deteriorates greatly. Further, it can fully secure the optical signal power $P_s(L)$ at the end point of the optical fiber 210.

The broken curve in FIG. 5D indicates the distribution of optical signal power $P_s(z)$ when the effective area $A_{\mathit{eff}}(z)$ is assumed to be constant regardless of position z. In this case, the optical signal power $P_s(L)$ becomes so high at the end point of the optical fiber 210 that a receiving error is likely to occur.

Thus, the optical fiber 210 in accordance with this embodiment is designed such that, as compared with the region with a higher pumping light power (in the vicinity of z=L) including the end portion 212 where the pumping light is supplied, the region, yielding a lower pumping light power, separated by a predetermined distance from the end portion 212 in the longitudinal direction attains a greater Raman gain $\alpha_g$.

For realizing such an optical fiber, as can be seen from the above-mentioned expressions (1) and (2), the optical fiber 210 in accordance with this embodiment is designed such that the region attaining the maximum value of Raman efficiency coefficient $g(z)/A_{\mathit{eff}}(z)$ resides in a region, yielding a lower pumping light power, separated by a predetermined distance in the advancing direction of pumping light from the end portion 212 (z=L) where the pumping light is supplied. More specifically, it is designed such that, while keeping the effective area $A_{\mathit{eff}}(z)$ substantially constant, the region attaining the maximum value of Raman gain coefficient g(z) resides in a region, yielding a lower pumping light power, separated by a predetermined distance in the advancing direction of pumping light from the end portion 212 (z=L) where the pumping light is supplied. Alternatively, as shown in FIG. 5B, it is designed such that, while keeping the Raman gain coefficient g(z) substantially constant, the region attaining the minimum value of effective area $A_{\mathit{eff}}(z)$ resides in a region, yielding a lower pumping light power, separated by a predetermined distance in the advancing direction of pumping light from the end portion 212 (z=L) where the pumping light is supplied. Also, for realizing such an optical fiber, it may be designed such that the region yielding the minimum value of transmission loss $\alpha_p$ at an pumping light wavelength resides in a region, yielding a lower pumping light power, separated by a predetermined distance in the advancing direction of pumping light from the end portion 212 (z=L) where the pumping light is supplied.

Figure 6A:
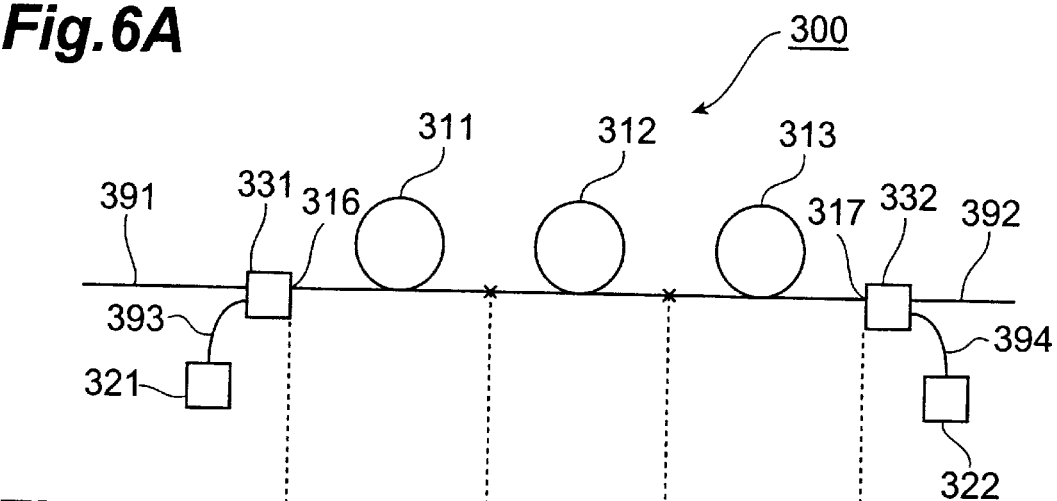
FIG. 6A is a view for explaining the optical transmission line and optical transmission system in accordance with a third embodiment.
Figure 6B:
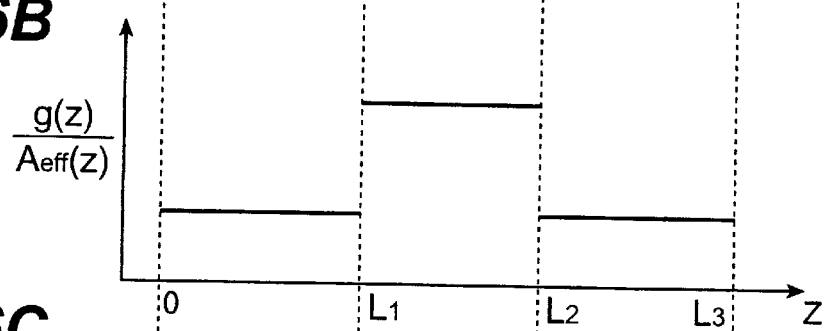
FIG. 6B is a graph showing the distribution of Raman efficiency coefficient $g(z)/A_{eff}(z)$ in optical fibers acting as the optical transmission line in accordance with the third embodiment.
Figure 6C:
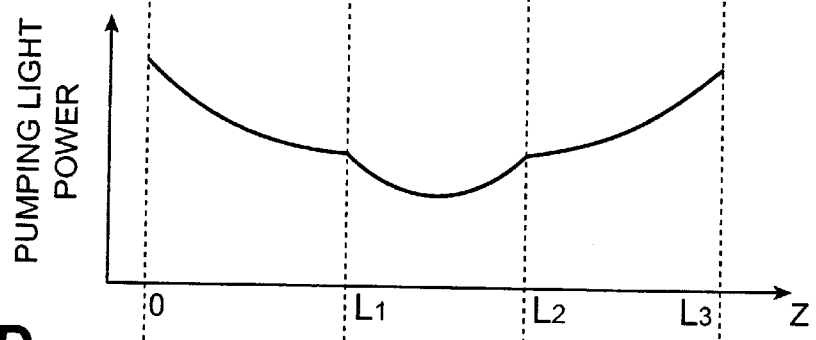
FIG. 6C is a graph showing the distribution of pumping light power in the optical fibers acting as the optical transmission line in accordance with the third embodiment.
Figure 6D:
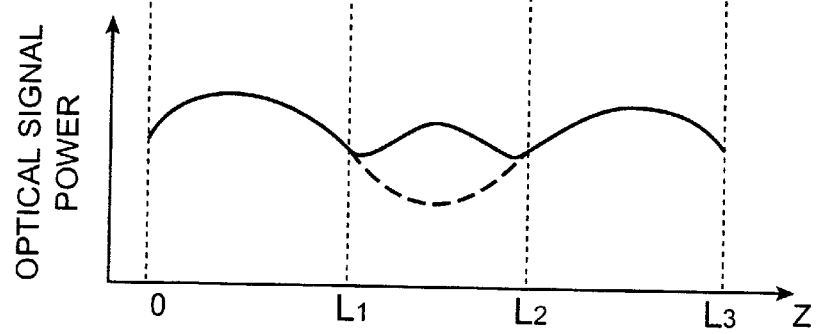
FIG. 6D is a graph showing the distribution of optical signal power in the optical fibers acting as the optical transmission line in accordance with the third embodiment.

A third embodiment of the present invention will now be explained. FIGS. 6A to 6D are explanatory views of the optical transmission system 300 and optical fibers 311 to 313 in accordance with the third embodiment. FIG. 6A shows the schematic configuration of the optical transmission system 300; FIG. 6B shows the distribution of Raman efficiency coefficient $g(z)A_{\mathit{eff}}(z)$ in the optical fibers 311 to 313; FIG. 6C shows the distribution of pumping light power in the optical fibers 311 to 313; and FIG. 6D shows the distribution of optical signal power in the optical fibers 311 to 313.

The optical transmission system 300 comprises the optical fibers 311 to 313, which constitute an optical transmission line enabling Raman amplification of an optical signal when pumping light is supplied thereto; pumping light sources 321, 322 for outputting the pumping light; and multiplexers 331, 332 for introducing the pumping light to the optical fibers 311 to 313. The pumping light outputted from the pumping light source 321 is supplied forward to the optical fibers 311 to 313 by way of an optical fiber 393 and the multiplexer 331. The pumping light outputted from the pumping light source 322 is supplied backward to the optical fibers 311 to 313 by way of an optical fiber 394 and the multiplexer 332. Namely, in the optical transmission system 300, the pumping light is bidirectionally supplied to the optical fibers 311 to 313. The optical signal having reached the multiplexer 331 by propagating through an optical fiber 391 is fed into the optical fiber 311 by way of the multiplexer 331 and is subjected to Raman amplification while propagating through the optical fibers 311 to 313. Then, the optical signal subjected to Raman amplification further propagates through an optical fiber 392 by way of the multiplexer 332.

The Raman efficiency coefficient $g(z)/A_{eff}(z)$ is the lowest in the optical fibers 311 and 313 at both ends including end portions 316, 317 where the pumping light is supplied, and is the highest in the center optical fiber 312 separated by a predetermined distance from the end portions 316, 317. As shown in FIG. 6C, the distribution of pumping light power in the optical fibers 311 to 313 is the sum of the distribution of pumping light power supplied forward (the power being the highest at position z=0, so as to become higher as the value of z is smaller) and the distribution of pumping light power supplied backward (the power being the highest at position z=L3, so as to become higher as the value of z is greater). As a consequence, the distribution of pumping light power is such that the power is the highest at position z=0 or z=L3 and is lower in the region near the center. Namely, the pumping light power is higher in the optical fibers 311 and 313 at both ends, and is lower in the center optical fiber 312.

The distribution of optical signal power $P_s(z)$ in the optical fibers 311 to 313 is the sum of the increase caused by Raman amplification and the transmission loss in the case where no Raman amplification is supposed to exist. Namely, the distribution of optical signal power $P_s(z)$ is such that, as shown in FIG. 6D, the optical signal power tends to repeatedly increase and decrease as z increases from z=0 to z=L3. Thus, the effective loss in the optical fibers 311 to 313 can be made smaller in the optical transmission system 300. Also, at any point of the optical fibers 311 to 313, the optical signal power can be restrained from increasing to such an extent that optical Kerr effects occur remarkably and from decreasing to such an extent that the SN ratio deteriorates greatly. Further, the optical signal power $P_s(L3)$ at the end point z=L3 of the optical transmission line constituted by the optical fibers 311 to 313 can fully be secured.

The broken curve in FIG. 6D indicates the distribution of optical signal power $P_s(z)$ in the case where the optical fiber 311 or optical fiber 313 is disposed in place of the optical fiber 312.

The optical transmission system 300 is designed such that the Raman gain $\alpha_g$ is the lowest in the optical fiber 311 or 313 including the region with the highest pumping light power among the optical fibers 311 to 313. For realizing such an optical transmission line constituted by the optical fibers 311 to 313, it is preferred that the optical fiber 312 including the region with the maximum value of Raman efficiency coefficient $g(z)/A_{eff}(z)$ be coupled to the optical fibers 311, 313 so as to be held therebetween as shown in FIG. 6B. Alternatively, it is preferred that, in the case where the effective area $A_{eff}(z)$ is substantially constant, the optical fiber 312 including the region with the maximum value of Raman gain coefficient $g(z)$ be coupled to the optical fibers 311, 313 so as to be held therebetween. Alternatively, it is preferred that, in the case where the Raman gain coefficient $g(z)$ is substantially constant, the optical fiber 312 including the region with the minimum value of effective area $A_{eff}(z)$ be coupled to the optical fibers 311, 313 so as to be held therebetween. Alternatively, it is preferred that the optical fiber 312 including the region with the minimum value of transmission loss $\alpha_p$ at an pumping light wavelength be coupled to the optical fibers 311, 313 so as to be held therebetween.

Preferably, the optical fiber 311 or 313 is an optical fiber whose core region is not intentionally doped with impurities, i.e., so-called pure silica core optical fiber. Since the pure silica core optical fiber yields lower transmission loss $\alpha_p$ and Raman efficiency coefficient $g(z)/A_{eff}(z)$ than conventional optical fibers whose core region is doped with Ge do, it can favorably be used in a region with a higher pumping light power including the end portions 316, 317 where the pumping light is supplied.

Letting R1 be the length of the optical fiber 312 including the region with the minimum value of effective area among the optical fibers 311 to 313, R2 be the length of the optical fibers 311, 312 having the end portions 316, 317 where the pumping light is supplied, and R3 be the length of the optical waveguide region excluding the optical fiber 312 with the minimum value of effective area in the optical transmission line constituted by the optical fibers 311 to 313, it is preferred that R2 be 10 km or less and $R1 \leq 4 \times R3$.

Alternatively, letting R1 be the length of the optical fiber 312 including the region with the minimum value of effective area among the optical fibers 311 to 313, and R2 be the length of the optical fibers 311, 312 having the end portions 316, 317 where the pumping light is supplied, it is preferred that R2 be 10 km or greater and $R1 \geq R2/4$.

As shown in FIG. 7, in the optical transmission system 300 in accordance with this embodiment, other optical fibers 314, 315 may be interposed between the optical fibers 311 and 312 and between the optical fibers 312 and 313, respectively.

Figure 8A:
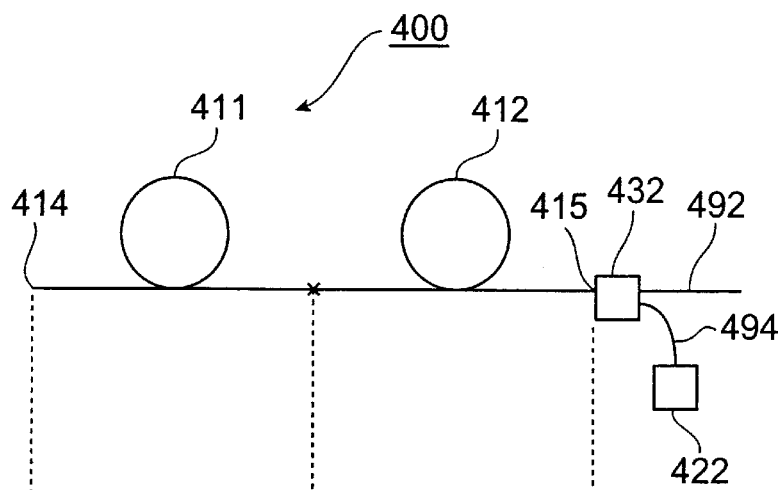
FIG. 8A is a view for explaining the optical transmission line and optical transmission system in accordance with a fourth embodiment.
Figure 8B:
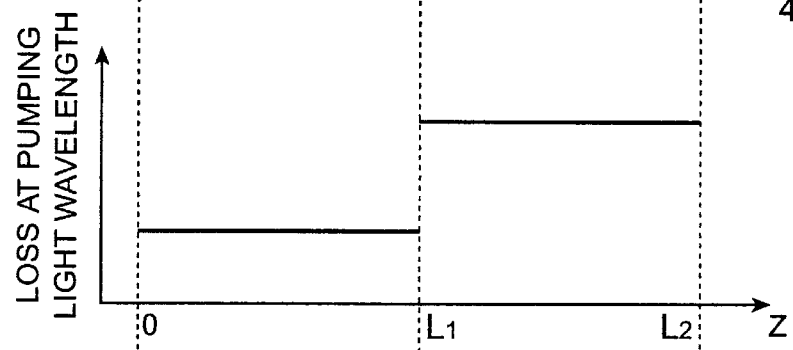
FIG. 8B is a graph showing the distribution of transmission loss $\alpha_p$ at an pumping light wavelength in optical fibers acting as the optical transmission line in accordance with the fourth embodiment.
Figure 8C:
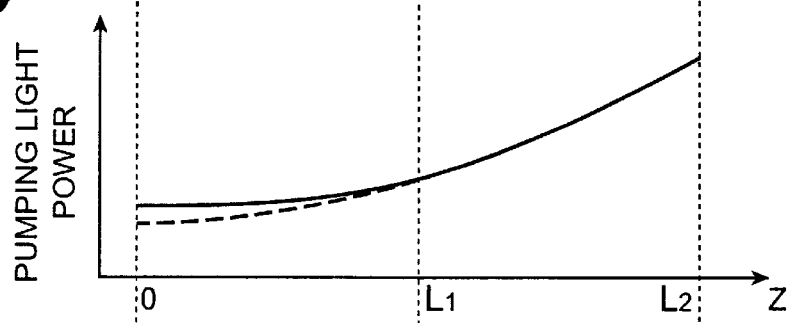
FIG. 8C is a graph showing the distribution of pumping light power in the optical fibers acting as the optical transmission line in accordance with the fourth embodiment.
Figure 8D:
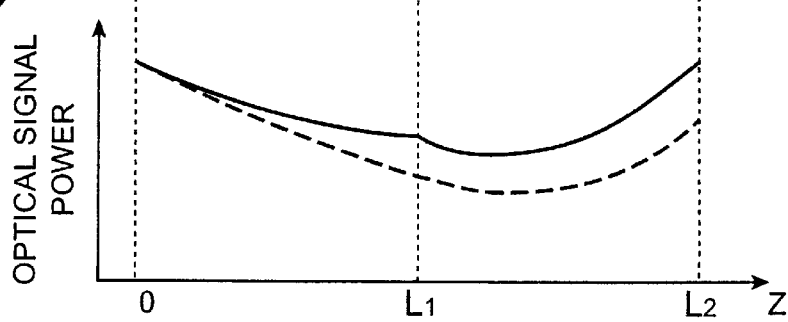
FIG. 8D is a graph showing the distribution of optical signal power in the optical fibers acting as the optical transmission line in accordance with the fourth embodiment.

A fourth embodiment of the present invention will now be explained. FIGS. 8A to 8D are explanatory views of the optical transmission system 400 and optical fibers 411, 412 in accordance with the fourth embodiment. FIG. 8A shows the schematic configuration of the optical transmission system 400; FIG. 8B shows the distribution of transmission loss $\alpha_p$ at an pumping light wavelength in the optical fibers 411, 412; FIG. 8C shows the distribution of pumping light power in the optical fibers 411, 412; and FIG. 8D shows the distribution of optical signal power in the optical fibers 411, 412.

The optical transmission system 400 comprises the optical fibers 411, 412, which constitute an optical transmission line enabling Raman amplification of an optical signal when pumping light is supplied thereto; an pumping light source 422 for outputting the pumping light; and a multiplexer 432 for introducing the pumping light to the optical fibers 411, 412. The pumping light outputted from the pumping light source 422 is supplied backward to the optical fibers 411, 412 by way of an optical fiber 494 and the multiplexer 432.

The optical signal fed into the optical fiber 411 is subjected to Raman amplification while propagating through the optical fibers 411, 412. Then, the optical signal subjected to Raman amplification further propagates through an optical fiber 492 by way of the multiplexer 432.

As shown in FIG. 8B, the distribution of transmission loss $\alpha_p$ at the pumping light wavelength in the optical fibers 411, 412 is such that the transmission loss is the greatest in the optical fiber 412 including the end portion 415 where the pumping light is supplied, and is the smallest in the optical fiber 411 farther from the multiplexer 432. As shown in FIG. 8C, the distribution of pumping light power in the optical fibers 411, 412 is such that the power is the highest at position z=L2, and is the lowest at position z=0. Since the transmission loss at the pumping light wavelength is smaller in the optical fiber 411 than in the optical fiber 412, the pumping light power is higher in the optical fiber 411 as compared with the case where both fibers have the same transmission loss $\alpha_p$ (the broken curve in FIG. 8C).

The distribution of optical signal power $P_s(z)$ in the optical fibers 411, 412 is the sum of the increase caused by Raman amplification and the transmission loss in the case where no Raman amplification is supposed to exist. Namely, the distribution of optical signal power $P_s(z)$ is such that, as shown in FIG. 8D, the optical signal power increases and decreases as z increases from z=0 to z=L2. Thus, the effective loss in the optical fibers 411, 412 can be made smaller in the optical transmission system 400. Also, at any point of the optical fibers 411, 412, the optical signal power can be restrained from increasing to such an extent that optical Kerr effects occur remarkably and from decreasing to such an extent that the SN ratio deteriorates greatly. Further, the optical signal power $P_s(L2)$ at the end point z=L2 of the optical transmission line constituted by the optical fibers 411, 412 can fully be secured.

The broken curve in FIG. 8D indicates the distribution of optical signal power $P_s(z)$ in the case where the transmission loss of the optical fiber 411 at the pumping light wavelength is supposed to be identical to that of the optical fiber 412.

Thus, the optical transmission system 400 in accordance with this embodiment is designed such that the Raman gain $\alpha_g$ is the lowest in the optical fiber 412 with the highest pumping light power including the end portion 415 where the pumping light is supplied in the optical fibers 411, 412. For realizing such an optical transmission line constituted by the optical fibers 411, 412, it is preferred that the optical fiber 411 including the region with the maximum value of Raman efficiency coefficient $g(z)/A_{eff}(z)$ and the optical fiber 412 be coupled to each other so as to constitute the optical transmission line. Alternatively, it is preferred that, in the case where the effective area $A_{eff}(z)$ is substantially constant, the optical fiber 411 including the region with the maximum value of Raman gain coefficient $g(z)$ and the optical fiber 412 be coupled to each other so as to constitute the optical transmission line. Alternatively, it is preferred that, in the case where the Raman gain coefficient $g(z)$ is substantially constant, the optical fiber 411 including the region with the minimum value of effective area $A_{eff}(z)$ and the optical fiber 412 be coupled to each other so as to constitute the optical transmission line. Alternatively, it is preferred that, as shown in FIG. 8B, the optical fiber 411 including the region with the minimum value of transmission loss $\alpha_p$ at the pumping light wavelength and the optical fiber 412 be coupled to each other so as to constitute the optical transmission line.

Figure 9:
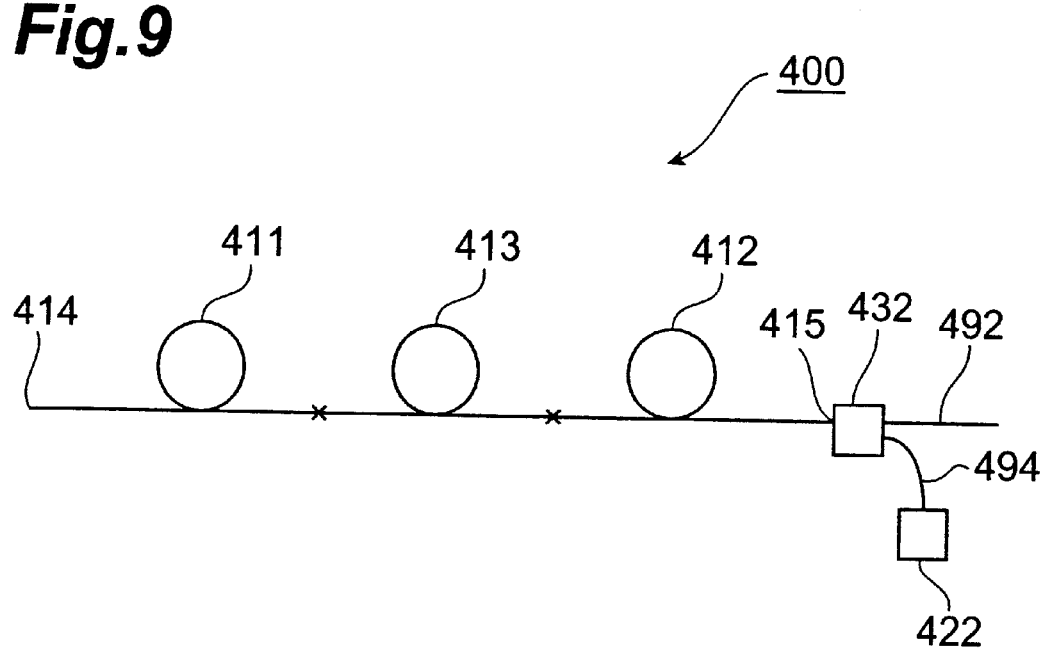
FIG. 9 is a view for explaining a modified example of the optical transmission line and optical transmission system in accordance with the fourth embodiment.

As shown in FIG. 9, in the optical transmission system 400 in accordance with this embodiment, another optical fiber 413 may be interposed between the optical fibers 411 and 412.

Figure 10A:
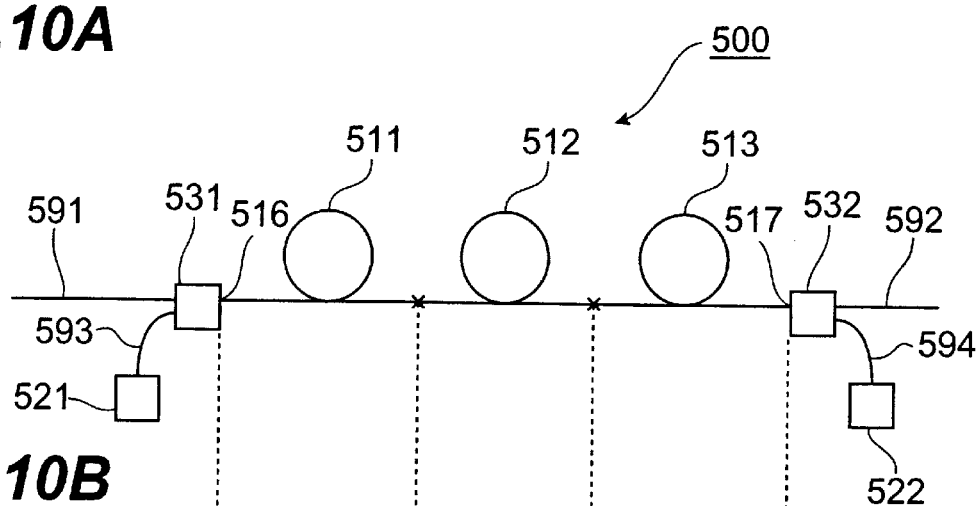
FIG. 10A is a view for explaining the optical transmission line and optical transmission system in accordance with a fifth embodiment.
Figure 10B:
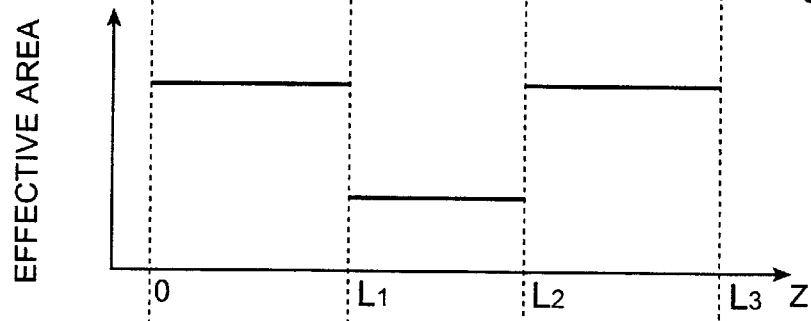
FIG. 10B is a graph showing the distribution of effective area $A_{eff}$ in optical fibers acting as the optical transmission line in accordance with the fifth embodiment.
Figure 10C:
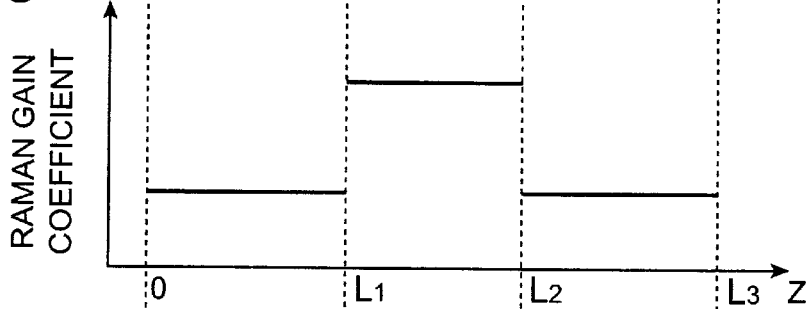
FIG. 10C is a graph showing the distribution of Raman gain coefficient $g(z)$ of the optical fibers acting as the optical transmission line in accordance with the fifth embodiment.
Figure 10D:
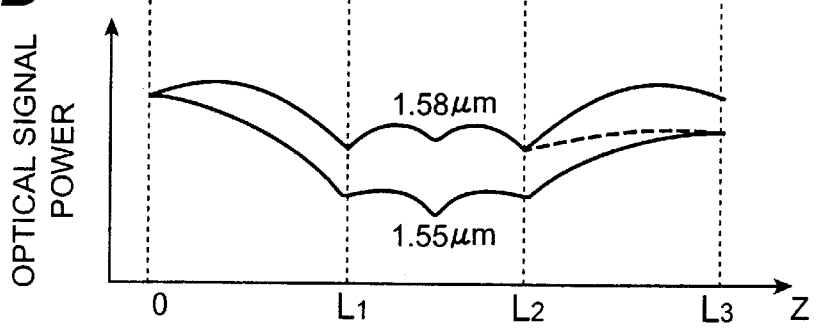
FIG. 10D is a graph showing the distribution of optical signal power of the optical fibers acting as the optical transmission line in accordance with the fifth embodiment.

A fifth embodiment of the present invention will now be explained. FIGS. 10A to 10D are explanatory views of the optical transmission system 500 and optical fibers 511 to 513 in accordance with the fifth embodiment. FIG. 10A shows the schematic configuration of the optical transmission system 500; FIG. 10B shows the distribution of effective area $A_{eff}(z)$ in the optical fibers 511 to 513; FIG. 10C shows the distribution of Raman gain coefficient $g(z)$ in the optical fibers 511 to 513; and FIG. 10D shows the distribution of optical signal power in the optical fibers 511 to 513.

The optical transmission system 500 comprises the optical fibers 511 to 513, which constitute an optical transmission line enabling Raman amplification of an optical signal when pumping light is supplied thereto; pumping light sources 521, 522 for outputting the pumping light; and multiplexers 531, 532 for introducing the pumping light to the optical fibers 511 to 513. Each of the optical fibers 511 and 513 is a single-mode optical fiber having a zero-dispersion wavelength near a wavelength of 1.3 $\mu$m. The optical fiber 512 is a dispersion-shifted optical fiber having a zero-dispersion wavelength at a wavelength slightly longer (or shorter) than a wavelength of 1.55 $\mu$m.

The pumping light outputted from the pumping light source 521 is supplied forward to the optical fibers 511 to 513 by way of an optical fiber 593 and the multiplexer 531. The pumping light outputted from the pumping light source 522 is supplied backward to the optical fibers 511 to 513 by way of an optical fiber 594 and the multiplexer 532. Namely, in the optical transmission system 500, the pumping light is bidirectionally supplied to the optical fibers 511 to 513. The optical signal having reached the multiplexer 531 by propagating through an optical fiber 591 is fed into the optical fiber 511 by way of the multiplexer 531 and is subjected to Raman amplification while propagating through the optical fibers 511 to 513. Then, the optical signal subjected to Raman amplification further propagates through an optical fiber 592 by way of the multiplexer 532.

As shown in FIG. 10B, the distribution of effective area $A_{eff}(z)$ is such that the effective area is larger in the optical fibers 511, 513 including end portions 516, 517 where the pumping light is supplied, and is smaller in the center optical fiber 512. As shown in FIG. 10C, the distribution of Raman gain coefficient $g(z)$ is such that the gain coefficient is lower in the optical fibers 511, 513 including the end portions 516, 517 where the pumping light is supplied, and is higher in the center optical fiber 512. The distribution of pumping light power in the optical fibers 511 to 513 is the sum of the distribution of pumping light power supplied forward (the power being the highest at position z=0, so as to become higher as the value of z is smaller) and the distribution of pumping light power supplied backward (the power being the highest at position z=L3, so as to become higher as the value of z is greater). As a consequence, the distribution of pumping light power is such that the power is the highest at position z=0 or z=L3 and is lower in the region near the center. Namely, the pumping light power is higher in the optical fibers 511 and 513 at both ends, and is lower in the center optical fiber 512.

The distribution of optical signal power $P_s(z)$ in the optical fibers 511 to 513 is the sum of the increase caused by Raman amplification and the transmission loss in the case where no Raman amplification is supposed to exist. Namely, the distribution of optical signal power $P_s(z)$ is such that, as shown in FIG. 10D, the optical signal power tends to repeatedly increase and decrease as z increases from z=0 to z=L3. Thus, the effective loss in the optical fibers 511 to 513 can be made smaller in the optical transmission system 500.

Also, at any point of the optical fibers 511 to 513, the optical signal power can be restrained from increasing to such an extent that optical Kerr effects occur remarkably and from decreasing to such an extent that the SN ratio deteriorates greatly. Further, the optical signal power $P_s(L3)$ at the end point z=L3 of the optical transmission line constituted by the optical fibers 511 to 513 can fully be secured.

Figure 11:
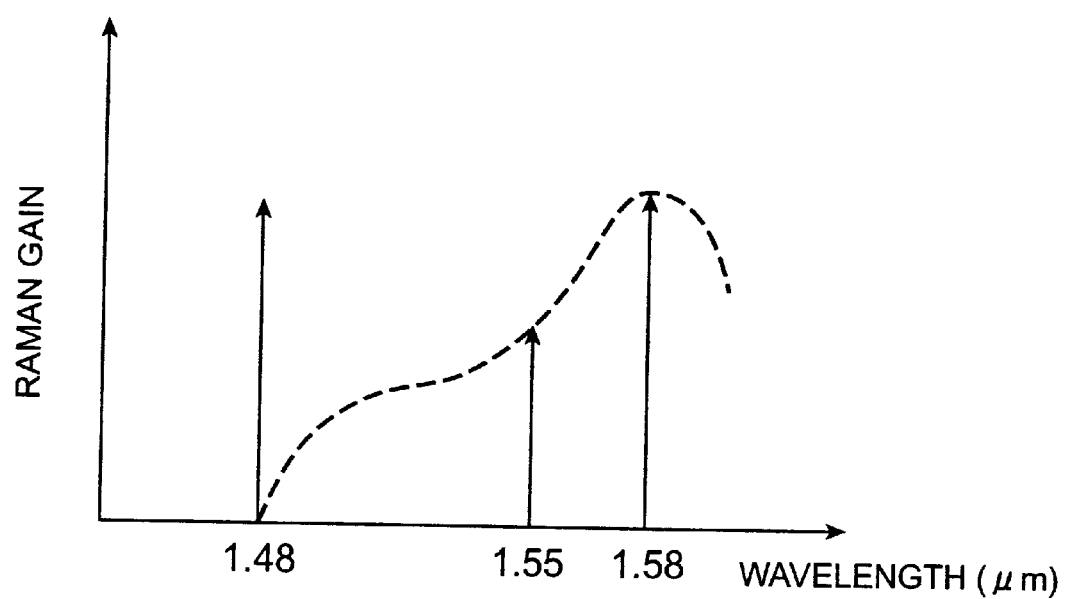
FIG. 11 is a graph showing the wavelength dependence of Raman gain.

In the case where the wavelength of optical signal is 1.55 μm or 1.58 μm, a semiconductor laser light source outputting laser light having a wavelength of 1.48 μm is preferably used as each of the pumping light sources 521, 522. When both of the optical signal having a wavelength of 1.55 μm and the optical signal having a wavelength of 1.58 μm propagate, the respective wavelengths of optical signals in the optical fibers 511 to 513 yield power distributions different from each other. It is because of the fact that, as FIG. 11 shows the wavelength dependence of Raman gain, the Raman gain at a wavelength of 1.58 μm is greater than that at a wavelength of 1.55 μm. However, in the optical signals at both of the wavelengths, at any point of the optical fibers 511 to 513, the optical signal power would neither increase to such an extent that optical Kerr effects occur remarkably nor decrease to such an extent that the SN ratio deteriorates greatly. Also, the optical signal power $P_s(L3)$ at the end point z=L3 of the optical transmission line constituted by the optical fibers 511 to 513 can fully be secured.

Another wavelength (e.g., 1.43 μm) of pumping light may also be introduced so as to effect wavelength division multiplexing of pumping light, whereby the difference in power between optical signals can be reduced. For example, the broken curve in FIG. 10D indicates the case where the pumping light source 522 employs pumping light at a wavelength of 1.43 μm for multiplexing.

The optical transmission system 100 to 500 in accordance with the above-mentioned first to fifth embodiments will be explained in further detail with reference to specific examples.

To begin with, a specific example of the optical transmission system 100 in accordance with the first embodiment will be explained with reference to FIG. 1A.

In the specific example of optical transmission system 100, the optical fiber 110 is a unitary optical fiber. The Raman gain coefficient g(z) of the optical fiber 110 is substantially constant with respect to position z, whereas the effective area $A_{eff}(z)$ changes substantially linearly with respect to position z such that it becomes 60 $\mu m^2$ at each of the end portions 133, 134 (z=0, L) where the pumping light is supplied, and 40 $\mu m^2$ near the center (z=L/2).

The dispersion of the optical fiber 110 changes substantially linearly with respect to position z such that it becomes 4 ps/nm/km at each of the end portions 133, 134 (z=0, L) where the pumping light is supplied, and –4 ps/nm/km near the center (z=L/2).

A specific example of the optical transmission system 200 in accordance with the second embodiment will now be explained with reference to FIG. 5A.

In the specific example of optical transmission system 200, the optical fiber 210 is a unitary optical fiber. The Raman gain coefficient g(z) of the optical fiber 210 is substantially constant with respect to position z, whereas the effective area $A_{eff}(z)$ changes in a form similar to that of an exponential function with respect to position z such that it becomes 65 $\mu m^2$ at the end portion 212 (z=L) where the pumping light is supplied, and 30 $\mu m^2$ at the other end 211 (z=0).

Also, the dispersion of the optical fiber 210 changes in a form similar to that of an exponential function with respect to position z such that it becomes 12 ps/nm/km at the end portion 212 (z=L) where the pumping light is supplied, and –4 ps/nm/km at the other end 211 (z=0).

Specific examples of the optical transmission system 300 in accordance with the third embodiment will now be explained with reference to FIGS. 6A and 7.

In a first specific example of the optical transmission system 300, each of the optical fibers 311 and 313 is a single-mode optical fiber (SMF) having, with respect to a signal wavelength of 1550 nm, an effective area of 80 $\mu m^2$ and a dispersion of 17 ps/nm/km. The optical fiber 312 is a dispersion-shifted optical fiber (DSF) having, with respect to a signal wavelength of 1550 nm, an effective area of 50 $\mu m^2$ and a dispersion of –1 ps/nm/km. Each of the optical fibers 311 and 313 has a length of 20 km, where as the optical fiber 312 has a length of 10 km.

In a second specific example of the optical transmission system 300, each of the optical fibers 311 and 313 is a dispersion-shifted optical fiber whose zero-dispersion wavelength is on the longer wavelength side from a wavelength of 1550 nm (NZDSF) having, with respect to a signal wavelength of 1550 nm, an effective area of 50 $\mu m^2$ and a dispersion of –5 ps/nm/km. The optical fiber 312 is a dispersion-shifted optical fiber whose zero-dispersion wavelength is on the shorter wavelength side from a wavelength of 1550 nm (NZDSF) having, with respect to a signal wavelength of 1550 nm, an effective area of 45 $\mu m^2$ and a dispersion of 5 ps/nm/km. Each of the optical fibers 311 and 313 has a length of 10 km, where as the optical fiber 312 has a length of 20 km.

In a third specific example of the optical transmission system 300, each of the optical fibers 311 and 313 is a pure silica core optical fiber (ZF) having, with respect to a signal wavelength of 1550 nm, an effective area of 80 $\mu m^2$ and a dispersion of 18 ps/nm/km. The optical fiber 312 is a dispersion-shifted optical fiber whose zero-dispersion wavelength is on the shorter wavelength side from a wavelength of 1550 nm (NZDSF) having, with respect to a signal wavelength of 1550 nm, an effective area of 55 $\mu m^2$ and a dispersion of 3 ps/nm/km. Each of the optical fibers 311 to 313 has a length of 20 km.

In a fourth specific example of the optical transmission system 300, each of the optical fibers 311 and 313 is a single-mode optical fiber (SMF) having, with respect to a signal wavelength of 1550 nm, an effective area of 120 $\mu m^2$ and a dispersion of 20 ps/nm/km. The optical fiber 312 is a dispersion-shifted optical fiber (DSF) having, with respect to a signal wavelength of 1550 nm, an effective area of 23 $\mu m^2$ and a dispersion of –30 ps/nm/km. Each of the optical fibers 311 and 313 has a length of 15 km, where as the optical fiber 312 has a length of 20 km.

Figure 12:
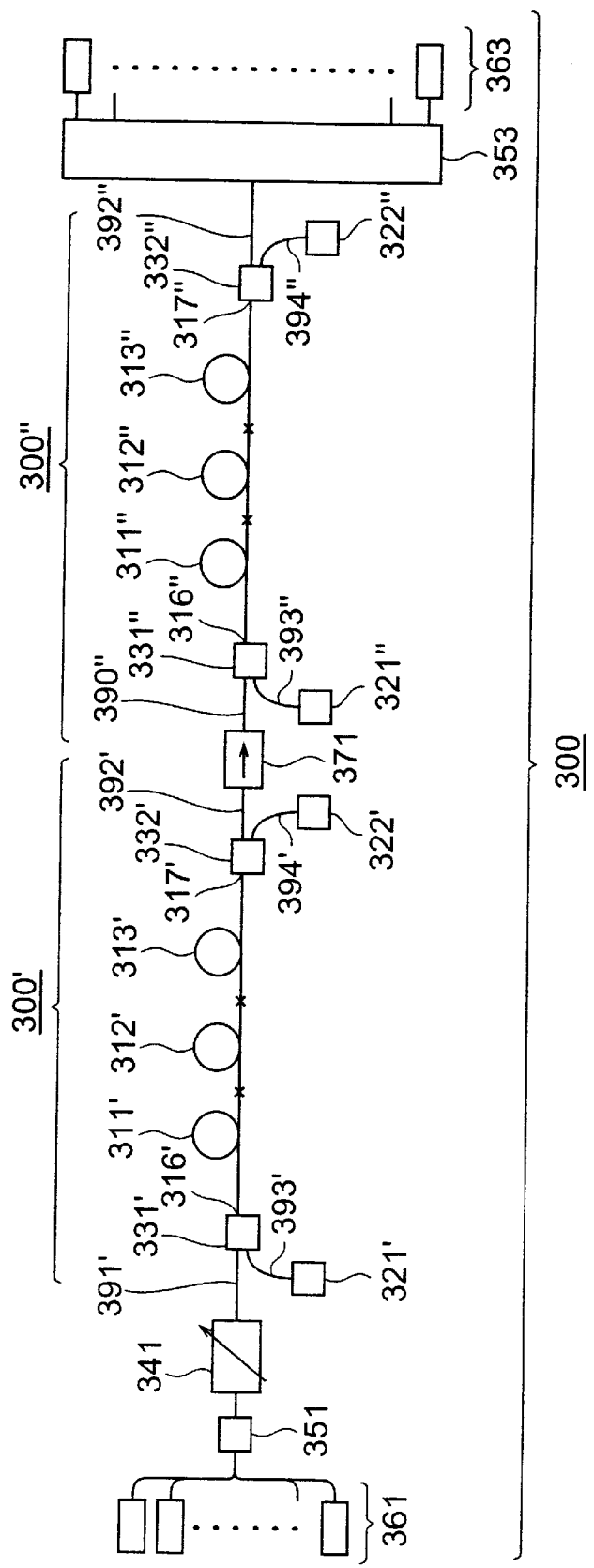
FIG. 12 is a view for explaining a fifth specific example of the optical transmission line and optical, transmission system in accordance with the third embodiment.

A fifth specific example of the optical transmission system 300 comprises a plurality of optical transmission systems, each shown in FIG. 6A, connected in series as shown in FIG. 12.

The optical transmission system 300 shown in FIG. 12 comprises a plurality of transmitters 361 for transmitting respective optical signals having wavelengths different from each other, and a plurality of receivers 363 for receiving respective optical signals having wavelengths different from each other. A plurality of optical signals transmitted from their corresponding transmitters 361 are multiplexed by a multiplexer 351. Thus multiplexed optical signal is sent out to an optical fiber 391' after its power is attenuated by an attenuator 341.

The optical signal propagating through the optical fiber 391' is fed, by way of a multiplexer 331', into an optical transmission line constituted by optical fibers 311' to 313' and is subjected to Raman amplification while propagating through this optical transmission line. The optical signal subjected to Raman amplification further propagates through an optical fiber 392" by way of a multiplexer 332'.

The optical signal propagating through the optical fiber 392' is fed into an optical fiber 391". The optical signal propagating through the optical fiber 391" is fed, by way of a multiplexer 331", into an optical transmission line constituted by optical fibers 311" to 313" and is subjected to Raman amplification while propagating through this optical transmission line. The optical signal subjected to Raman amplification further propagates through an optical fiber 392" by way of a multiplexer 332". The optical signal propagating through the optical fiber 392" is demultiplexed by a demultiplexer 353 into optical signals having wavelengths different from each other, which are then received by their corresponding receivers 363.

In this specific example, since an optical isolator 371 is disposed between the optical transmission systems 300', 300", the backscattering light of signal would not leak toward the optical transmission system 300', where by transmission characteristics can be restrained from deteriorating.

In this specific example, each of the optical fibers 311', 311" and optical fibers 313', 313" is a single-mode optical fiber (SMF) having, with respect to a signal wavelength of 1550 nm, an effective area of 80 $\mu m^2$ and a dispersion of 17 ps/nm/km. Each of the optical fibers 312', 312" is a dispersion-shifted optical fiber (DSF) having, with respect to a signal wavelength of 1550 nm, an effective area of 50 $\mu m^2$ and a dispersion of −1 ps/nm/km. Each of the optical fibers 311', 311" and optical fibers 313', 313" has a length of 18 km, where as each of the optical fibers 312', 312" has a length of 14 km.

In the fifth specific example of optical transmission system 300, transmission characteristics were evaluated at a transmission speed of 10 Gb/s by use of eight optical signals (having a center wavelength of 1550 nm) at intervals of 100 GHz. The output of the attenuator 341 was −20 dBm per channel. Each of the pumping light sources 321', 322', 321", 322" was of a wavelength division multiplexing type in which a single unit employed pumping light having a wavelength of 1430 nm and pumping light having a wavelength of 1480 nm, where as the total output power of single unit was 27 dBm. As a result, it was possible to carry out error-free transmission in all the channels (though dispersion compensation was effected for each optical signal on the receiver side).

When the supply of pumping light from the pumping light sources 321', 322', 321", 322" was cut, by contrast, it was impossible to carry out favorable transmission. When the optical fibers 312', 312" were eliminated, so that the optical transmission line was constituted by single-mode optical fibers (SMFs) alone, a penalty of 1 dB or greater was yielded, where by it was impossible to carry out favorable transmission.

In the case where the output of attenuator 341 was 0 dBm per channel, it was also possible to carry out error-free transmission in all the channels. In the case where the optical fibers 311', 311", 313', 313" were eliminated, so that the optical transmission line was constituted by the dispersion-shifted optical fibers (DSFs) alone, it was impossible to carry out favorable transmission.

Here, the error-free transmission refers to one in which the curve of bit error rate (BER) does not become a floor state. The floor state refers to a state where BER would not decrease from a certain level even if the received power is raised as indicated by the broken curve in FIG. 13.

Figure 13:
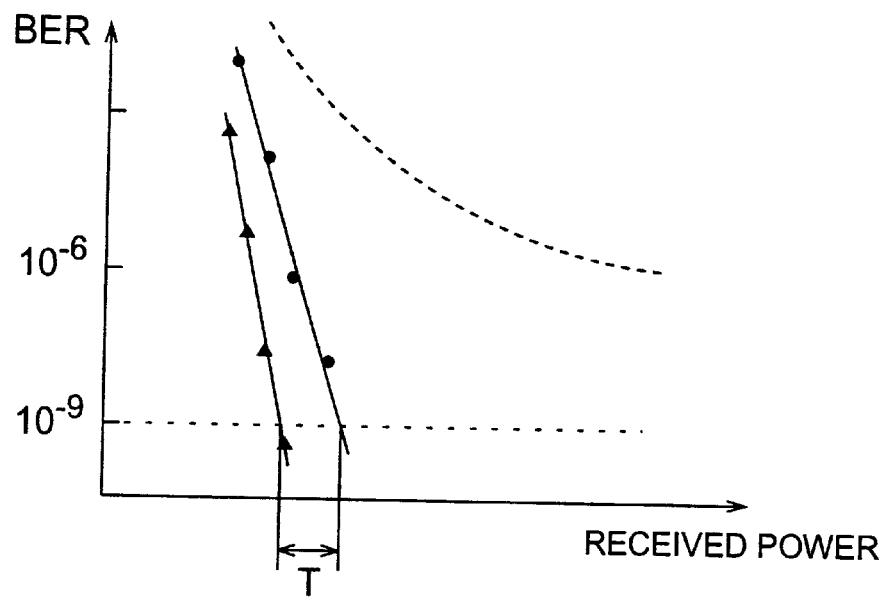
FIG. 13 is a graph showing relationships between bit error rate (BER) and received power for explaining penalty T.

The penalty indicates the degree of deterioration in receiving sensitivity after an optical transmission line is inserted with respect to the BER characteristic in the case where the receiver and transmitter are directly connected to each other (i.e., Back to Back characteristic, indicated by black triangles in FIG. 13). A typical example thereof is the level difference T at a BER of $10^{-9}$.

A sixth specific example of the optical transmission system 300 relates to an optical transmission system in which, as shown in FIG. 7, an optical fiber 314 is disposed between optical fibers 311 and 312, where as an optical fiber 315 is disposed between optical fibers 312 and 313. Each of the optical fibers 311 and 313 is a single-mode optical fiber (SMF) having, with respect to a signal wavelength of 1550 nm, an effective area of 80 $\mu m^2$ and a dispersion of 17 ps/nm/km. The optical fiber 312 is a dispersion-shifted optical fiber (DCF) having, with respect to a signal wavelength of 1550 nm, an effective area of 16 $\mu m^2$ and a dispersion of −80 ps/nm/km. Each of the optical fibers 314 and 315 is a dispersion-shifted optical fiber whose zero-dispersion wavelength is on the shorter wavelength side from a wavelength of 1550 nm (NZDSF) having, with respect to a signal wavelength of 1550 nm, an effective area of 50 $\mu m^2$ and a dispersion of 4 ps/nm/km. Each of the optical fibers 311 and 313 has a length of 20 km, the optical fiber 312 has a length of 10 km, and each of the optical fibers 314 and 315 has a length of 20 km.

Specific examples of the optical transmission system 400 in accordance with the fourth embodiment will now be explained with reference to FIG. 8A.

In a first specific example of the optical transmission system 400, the optical fiber 411 is a dispersion-shifted optical fiber (DSF) having, with respect to a signal wavelength of 1550 nm, an effective area of 50 $\mu m^2$ and a dispersion of −1 ps/nm/km. The optical fiber 412 is a single-mode optical fiber (SMF) having, with respect to a signal wavelength of 1550 nm, an effective area of 80 $\mu m^2$ and a dispersion of 17 ps/nm/km. The optical fiber 411 has a length of 10 km, where as the optical fiber 412 has a length of 25 km.

In a second specific example of the optical transmission system 400, the optical fiber 411 is a dispersion-shifted optical fiber whose zero-dispersion wavelength is on the shorter wavelength side from a wavelength of 1550 nm (NZDSF) having, with respect to a signal wavelength of 1550 nm, an effective area of 45 $\mu m^2$ and a dispersion of 5 ps/nm/km. The optical fiber 412 is a dispersion-shifted optical fiber whose zero-dispersion wavelength is on the longer wavelength side from a wavelength of 1550 nm (NZDSF) having, with respect to a signal wavelength of 1550 nm, an effective area of 50 $\mu m^2$ and a dispersion of −5 ps/nm/km. Each of the optical fibers 411 and 412 has a length of 20 km.

In a third specific example of the optical transmission system 400, the optical fiber 411 is a dispersion-shifted optical fiber whose zero-dispersion wavelength is on the shorter wavelength side from a wavelength of 1550 nm (NZDSF) having, with respect to a signal wavelength of 1550 nm, an effective area of 50 $\mu m^2$ and a dispersion of 3 ps/nm/km. The optical fiber 412 is a pure silica core optical fiber (ZF) having, with respect to a signal wavelength of 1550 nm, an effective area of 80 $\mu m^2$ and a dispersion of 18 ps/nm/km. The optical fiber 411 has a length of 15 km, where as the optical fiber 412 has a length of 25 km.

In a fourth example of the optical transmission system 400, the optical fiber 411 is a dispersion-compensating optical fiber (DCF) having, with respect to a signal wavelength of 1550 nm, an effective area of 22 $\mu m^2$ and a dispersion of −40 ps/nm/km. The optical fiber 412 is a single-mode optical fiber (SMF) having, with respect to a signal wavelength of 1550 nm, an effective area of 80 $\mu m^2$ and a dispersion of 17 ps/nm/km. The optical fiber 411 has a length of 20 km, where as the optical fiber 412 has a length of 15 km.

Figure 14:
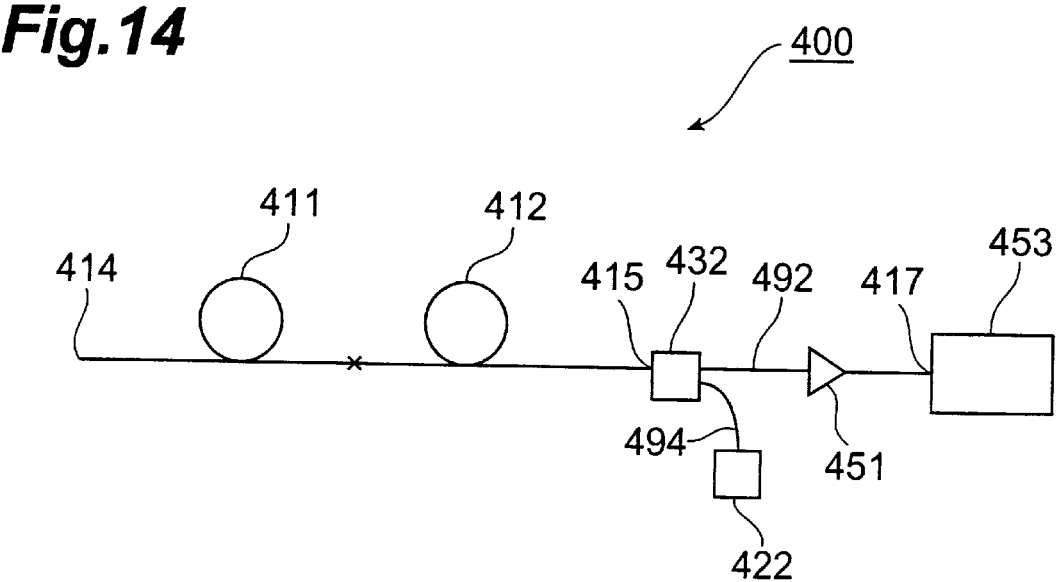
FIG. 14 is a view for explaining a fifth specific example of the optical transmission line and optical transmission system in accordance with the fourth embodiment.

In a fifth specific example of the optical transmission system 400, as shown in FIG. 14, the optical transmission system 400 shown in FIG. 8A further comprises an amplifier constituted by an optical fiber 451 doped with erbium (Er) and a receiving section 453. The optical fiber 451 has one end coupled to the optical fiber 492 by fusion or the like, and the other end coupled to the receiving section 453.

In this specific example, the optical fiber 411 is a dispersion-shifted optical fiber (DSF) having, with respect to a signal wavelength of 1550 nm, an effective area of 50 $\mu m^2$ and a dispersion of −1 ps/nm/km. The optical fiber 412 is a single-mode optical fiber (SMF) having, with respect to a signal wavelength of 1550 nm, an effective area of 80 $\mu m^2$ and a dispersion of 17 ps/nm/km. Each of the optical fibers 411, 412 has a length of 20 km.

Figure 15:
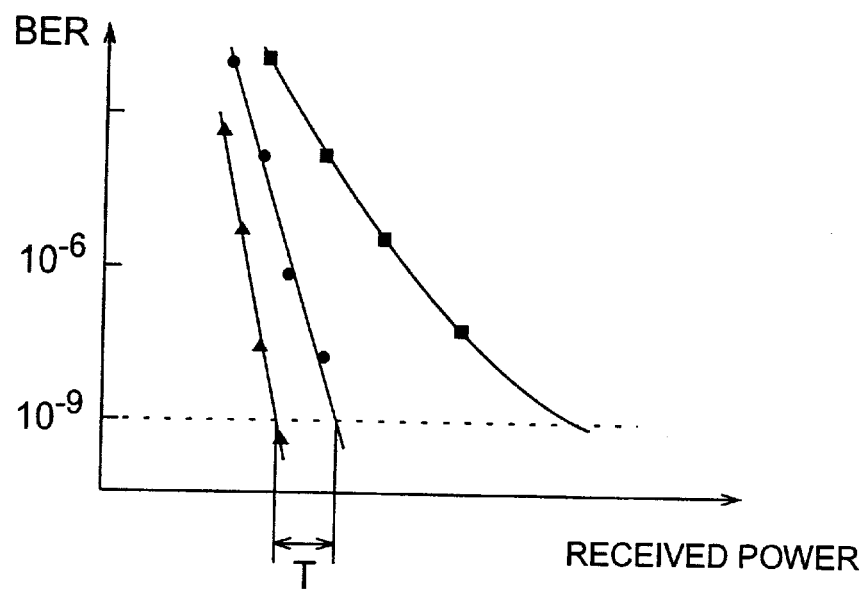
FIG. 15 is a graph showing relationships between bit error rate (BER) and received power of a fifth specific example of the optical transmission line and optical transmission system in accordance with the fourth embodiment.

In the fifth specific example of optical transmission system 400, transmission characteristics were evaluated at a transmission speed of 2.5 Gb/s by use of four optical signals (having a center wavelength of 1550 nm) at intervals of 100 GHz. The result thereof is shown in FIG. 15. In FIG. 15, Back to Back characteristics were indicated by black triangles, transmission characteristics in the case where the SN ratio of optical signal was 18 dB at its exit end 417 were indicated by black circles, and transmission characteristics in the case where the SN ratio of optical signal was 16 dB at the exit end 417 were indicated by black squares. As shown in FIG. 15, when the SN ratio of optical signal at the exit end 417 was 18 dB or higher, the penalty T became 0.5 dB or lower, where by it was possible for the optical transmission system 400 to secure stable operations.

Figure 16:
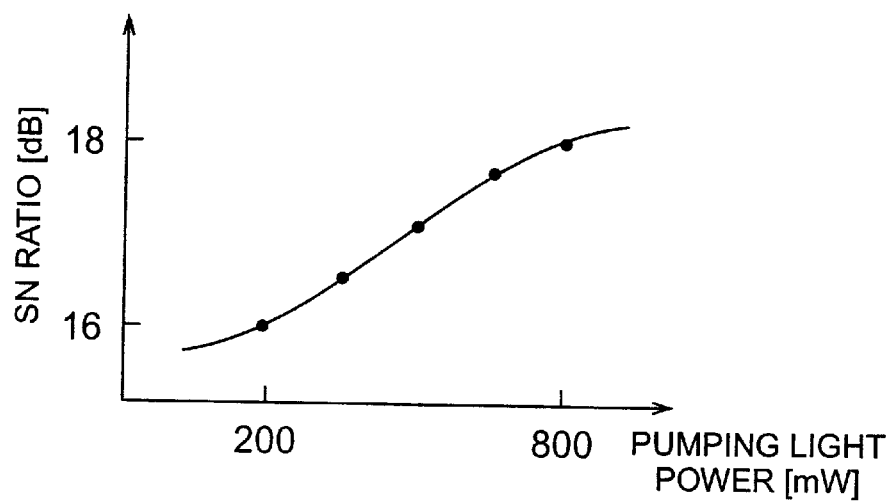
FIG. 16 is a graph showing relationships between pumping light power and SN ratio.

When the SN ratio was 16 dB, by contrast, it was seen that the penalty T was enhanced, where by it was impossible to carry out favorable transmission. Here, as shown in FIG. 16, if the pumping light power is sufficiently raised, then the SN ratio can be increased to 18 dB or higher, where by favorable transmission characteristics can be secured.

Figure 17:
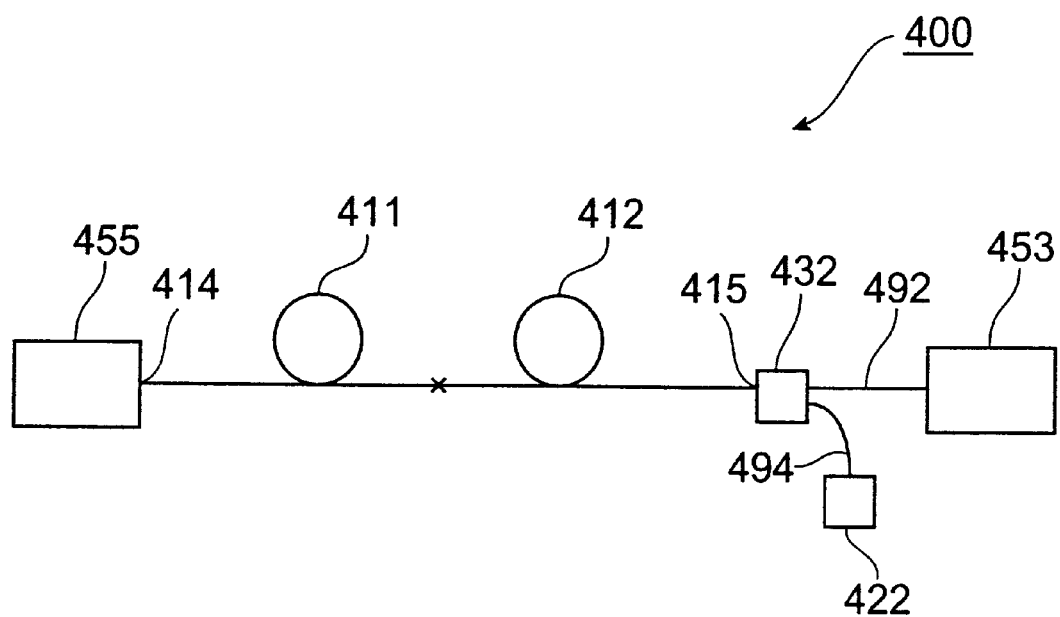
FIG. 17 is a view for explaining a sixth specific example of the optical transmission line and optical transmission system in accordance with the fourth embodiment.

In a sixth specific example of the optical transmission system 400, as shown in FIG. 17, the optical transmission system 400 shown in FIG. 8A further comprises a transmitting section 455 and a receiving section 453. The transmitting section 455 has an end portion 414 coupled to the optical fiber 411, where as the receiving section 453 is coupled to the optical fiber 492.

In this specific example, the optical fiber 411 is a dispersion-compensating optical fiber (DCF) having, with respect to a signal wavelength of 1550 nm, an effective area of 40 $\mu m^2$ and a dispersion of −8 ps/nm/km. The optical fiber 412 is a single-mode optical fiber (SMF) having, with respect to a signal wavelength of 1550 nm, an effective area of 80 $\mu m^2$ and a dispersion of 17 ps/nm/km. The optical fiber 411 has a length of 31.9 km, where as the optical fiber 412 has a length of 15 km. Here, the dispersion of the optical transmission line constituted by the optical fibers 411 and 412 is substantially 0 ps/nm/km.

In the sixth specific example-of optical transmission system 400, transmission characteristics were evaluated at a transmission speed of 10 Gb/s by use of eight optical signals (having a center wavelength of 1550 nm) at intervals of 100 GHz. As a result, it was possible to attain a penalty of 1 dB or less in the case where the pumping light power was controlled so as to become 600 mW or higher.

By contrast, it was impossible to attain a penalty of 1 dB or less even when the pumping light power was controlled in the case where transmission characteristics were evaluated as mentioned above while using a dispersion-compensating optical fiber (DCF) having, with respect to a signal wavelength of 1550 nm, an effective area of 45 $\mu m^2$ and a dispersion of −5 ps/nm/km, and a length of 51 km as the optical fiber 411.

A seventh specific example of the optical transmission system 400 relates to an optical transmission system in which an optical fiber 413 is disposed between optical fibers 411 and 412 as shown in FIG. 9. The optical fiber 411 is a dispersion-compensating optical fiber (DCF) having, with respect to a signal wavelength of 1550 nm, an effective area of 30 $\mu m^2$ and a dispersion of −20 ps/nm/km. The optical fiber 412 is a single-mode optical fiber (SMF) having, with respect to a signal wavelength of 1550 nm, an effective area of 80 $\mu m^2$ and a dispersion of 17 ps/nm/km. The optical fiber 413 is a dispersion-shifted optical fiber whose zero-dispersion wavelength is on the longer wavelength side from a wavelength of 1550 nm (NZDSF) having, with respect to a signal wavelength of 1550 nm, an effective area of 45 $\mu m^2$ and a dispersion of −4 ps/nm/km. The optical fiber 411 has a length of 10 km, where as each of the optical fibers 412 and 413 has a length of 20 km.

As in the foregoing, since the optical transmission line in accordance with the present invention has a smaller Raman amplification effect in the region with a higher pumping light power, and a greater Raman amplification effect in the region with a lower pumping light power, it can restrain, at any point of the optical transmission line, the optical signal from enhancing its power to such an extent that optical Kerr effects occur remarkably and from lowering its power to such an extent that the SN ratio greatly deteriorates, and can fully secure the power of optical signal at the end point of optical transmission line. Also, it can lower the effective loss in the optical transmission line.

From the invention thus described, it will be obvious that the invention may be varied in many ways. Such variations are:not to be regarded as a departure from the spirit and scope of the invention, and all such modifications as would be obvious to one skilled in the art are intended for inclusion within the scope of the following claims.

What is claimed is:

1. An optical transmission line enabling Raman amplification of an optical signal when pumping light is supplied thereto, and comprising a multiplexer, for introducing said pumping light, arranged at an end portion where said pumping light is supplied, wherein a first region yielding a maximum value of a Raman gain coefficient is separated from an end portion where said pumping light is supplied by a predetermined distance along a direction in which said pumping light advances, wherein a second region yielding a predetermined value (>0) of a Raman gain smaller than that at said first region is provided between said first region and said end portion where said pumping light is supplied, and wherein said first region includes a part at which a Raman gain is smaller than a transmission loss at a wavelength of said optical signal.

2. An optical transmission line according to claim 1, wherein said maximum value of Raman gain coefficient is greater by at least 20% than the Raman gain coefficient at the end portion where said pumping light is supplied.

3. An optical transmission line according to claim 1, wherein said optical transmission line comprises an optical fiber whose core region contains Ge, and wherein the region yielding said maximum value of Raman gain coefficient has Ge content greater than that in the region including the end portion where said pumping light is supplied.

4. An optical transmission line according to claim 1, wherein an optical waveguide region is doped with an impurity which can amplify said optical signal.

5. An optical transmission line according to claim 4, wherein said impurity includes Er element.

6. An optical transmission line according to claim 1, wherein said optical transmission line comprises a polarization-preserving optical fiber which propagates light while keeping a state of polarization of said light.

7. An optical transmission line according to claim 1, wherein said optical transmission line has a polarization mode dispersion of 0.25 ps/km$^{1/2}$ or less at a wavelength of said optical signal.

8. An optical transmission line according to claim 1, wherein said optical transmission line comprises a unitary optical fiber.

9. An optical transmission line comprising an optical transmission line according to claim 1, and an erbium-doped optical fiber constituting an optical amplifier,
wherein said erbium-doped optical fiber is connected to said multiplexer.

10. An optical transmission line enabling Raman amplification of an optical signal when pumping light is supplied thereto, and comprising a multiplexer, for introducing said pumping light, arranged at an end portion where said pumping light is supplied,
wherein a first region yielding a minimum value of effective area is separated from an end portion where said pumping light is supplied by a predetermined distance along a direction in which said pumping light advances, and
wherein a second region yielding a predetermined value (>0) of a Raman gain smaller than that at said first region is provided between said first region and said end portion where said pumping light is supplied, and
wherein said first region includes a part at which a Raman gain is smaller than a transmission loss at a wavelength of said optical signal.

11. An optical transmission line according to claim 10, wherein said minimum value of effective area is smaller by at least 20% than the effective area at the end portion where said pumping light is supplied.

12. An optical transmission line according to claim 10, wherein said optical transmission line comprises an optical fiber whose core region contains Ge, and wherein the region yielding said minimum value of effective area has Ge content greater than that in the region including the end portion where said pumping light is supplied.

13. An optical transmission line according to claim 10, wherein an optical waveguide region is doped with an impurity which can amplify said optical signal.

14. An optical transmission line according to claim 13, wherein said impurity includes Er element.

15. An optical transmission line according to claim 10, wherein said optical transmission line comprises a polarization-preserving optical fiber which propagates light while keeping a state of polarization of said light.

16. An optical transmission line according to claim 10, wherein said optical transmission line has a polarization mode dispersion of 0.25 ps/km$^{1/2}$ or less at a wavelength of said optical signal.

17. An optical transmission line according to claim 10, wherein said optical transmission line comprises a unitary optical fiber.

18. An optical transmission line comprising an optical transmission line according to claim 10, and an erbium-doped optical fiber constituting an optical amplifier,
wherein said erbium-doped optical fiber is connected to said multiplexer.

19. An optical transmission line enabling Raman amplification of an optical signal when pumping light is supplied thereto, and comprising a multiplexer, for introducing said pumping light, arranged at an end portion of the transmission line at which said pumping light is supplied,
wherein said optical transmission line comprises a plurality of optically connected optical fibers, an optical fiber having an end part corresponding to the end portion of said optical transmission line where said pumping light is supplied is an optical fiber whose core region is not intentionally doped with germanium element, and a region yielding a minimum value of transmission loss at a wavelength of said pumping light is separated from an end portion where said pumping light is supplied by a predetermined distance along a direction in which said pumping light advances.

20. An optical transmission line according to claim 19, wherein said minimum value of transmission loss is smaller by at least 20% than the transmission loss at the end portion where said pumping light is supplied.

21. An optical transmission line according to claim 19, wherein said optical transmission line comprises an optical fiber whose core region contains Ge, and wherein the region yielding said minimum value of transmission loss has Ge content less than that in the region including the end portion where said pumping light is supplied.

22. An optical transmission line according to claim 19, wherein an optical waveguide region is doped with an impurity which can amplify said optical signal.

23. An optical transmission line according to claim 22, wherein said impurity includes Er element.

24. An optical transmission line according to claim 19, wherein said optical transmission line comprises a polarization-preserving optical fiber which propagates light while keeping a state of polarization of said light.

25. An optical transmission line according to claim 19, wherein said optical transmission line has a polarization mode dispersion of 0.25 ps/km$^{1/2}$ or less at a wavelength of said optical signal.

26. An optical transmission line comprising an optical transmission line according to claim 19, and an erbium-doped optical fiber constituting an optical amplifier,
wherein said erbium-doped optical fiber is connected to said multiplexer.

27. An optical transmission line according to claim 19, wherein said plurality of optical fibers include a first optical fiber having an end part corresponding to the end portion of said optical transmission line where said pumping light is supplied and a second optical fiber for receiving said pumping light having propagated through said first optical fiber, said first optical fiber having a Raman gain lower than that of said second optical fiber.

28. An optical transmission system comprising a transmitter for sending out an optical signal, the optical transmission line according to claim 19 for transmitting the optical signal sent out from said transmitter, pumping light supply means for supplying pumping light to said optical transmission line, and a receiver for receiving the optical signal propagated through said optical transmission line.

29. An optical transmission system according to claim 28, wherein said optical transmission line has a zero-dispersion wavelength at a given point in a wavelength band of said pumping light.

30. An optical transmission system according to claim 28, wherein said optical transmission line has a zero-dispersion wavelength at a given point in a wavelength band of said signal light.

31. An optical transmission system according to claim 28, wherein said pumping light supplied to said optical transmission line includes at least two intersecting polarized waves.

32. An optical transmission line according to claim 19, wherein said plurality of optical fibers comprise an optical fiber having a predetermined characteristic and an optical fiber having a characteristic different from said predetermined characteristic.

33. An optical transmission line enabling Raman amplification of an optical signal when pumping light is supplied thereto, and comprising a multiplexer, for introducing said pumping light, arranged at an end portion where said pumping light is supplied to,
wherein a first region yielding a maximum value of a Raman efficiency coefficient which is a ratio of a Raman gain coefficient to an effective area is separated from an end portion where said pumping light is supplied by a predetermined distance along a direction in which said pumping light advances, and
wherein a second region yielding a predetermined value (>0) of a Raman gain smaller than that at said first region is provided between said first region and said end portion where said pumping light is supplied, and
wherein said first region includes a part at which a Raman gain is smaller than a transmission loss at a wavelength of said optical signal.

34. An optical transmission line according to claim 33, wherein said maximum value of Raman efficiency coefficient is greater by at least 20% than the Raman efficiency coefficient at the end portion where said pumping light is supplied.

35. An optical transmission line according to claim 33, wherein, letting $\alpha_p$ be the transmission loss with respect to an pumping light wavelength, and z be the position in a longitudinal direction of said optical transmission line, said Raman efficiency coefficient has a maximum value of gradient of at least $0.2\ \exp(\alpha_p z)$.

36. An optical transmission line according to claim 35, wherein said Raman efficiency coefficient has a maximum value of gradient of at least $0.4\ \exp(\alpha_p z)$.

37. An optical transmission line according to claim 33, wherein said optical transmission line comprises an optical fiber whose core region contains Ge, and wherein the region yielding said maximum value of Raman efficiency coefficient has Ge content greater than that in the region including the end portion where said pumping light is supplied.

38. An optical transmission line according to claim 33, wherein an optical waveguide region is doped with an impurity which can amplify said optical signal.

39. An optical transmission line according to claim 38, wherein said impurity includes Er element.

40. An optical transmission line according to claim 33, wherein said optical transmission line comprises a polarization-preserving optical fiber which propagates light while keeping a state of polarization of said light.

41. An optical transmission line according to claim 33, wherein said optical transmission line has a polarization mode dispersion of $0.25\ \mathrm{ps/km}^{1/2}$ or less at a wavelength of said optical signal.

42. An optical transmission line according to claim 33, wherein said optical transmission line comprises a unitary optical fiber.

43. An optical transmission line comprising an optical transmission line according to claim 33, and an erbium-doped optical fiber constituting an optical amplifier,
wherein said erbium-doped optical fiber is connected to said multiplexer.

* * * * *